US011640000B2

(12) United States Patent
Gausebeck et al.

(10) Patent No.: US 11,640,000 B2
(45) Date of Patent: May 2, 2023

(54) SYSTEM AND METHOD OF CAPTURING AND GENERATING PANORAMIC THREE-DIMENSIONAL IMAGES

(71) Applicant: Matterport, Inc., Sunnyvale, CA (US)

(72) Inventors: David Alan Gausebeck, Sunnyvale, CA (US); Kirk Stromberg, Sunnyvale, CA (US); Louis D. Marzano, Sunnyvale, CA (US); David Proctor, Sunnyvale, CA (US); Naoto Sakakibara, Sunnyvale, CA (US); Simeon Trieu, Sunnyvale, CA (US); Kevin Kane, Sunnyvale, CA (US); Simon Wynn, Sunnyvale, CA (US)

(73) Assignee: Matterport, Inc., Sunnyvale, CA (US)

( * ) Notice: Subject to any disclaimer, the term of this patent is extended or adjusted under 35 U.S.C. 154(b) by 0 days.

(21) Appl. No.: 17/664,602

(22) Filed: May 23, 2022

(65) Prior Publication Data
US 2022/0317307 A1 Oct. 6, 2022

Related U.S. Application Data

(63) Continuation of application No. 17/137,958, filed on Dec. 30, 2020.

(60) Provisional application No. 62/955,414, filed on Dec. 30, 2019.

(51) Int. Cl.
| | |
|---|---|
| *G01S 17/89* | (2020.01) |
| *G01S 17/931* | (2020.01) |
| *G01S 7/481* | (2006.01) |
| *G03B 37/00* | (2021.01) |
| *H04N 5/232* | (2006.01) |

(52) U.S. Cl.
CPC .......... *G01S 17/931* (2020.01); *G01S 7/4813* (2013.01); *G01S 7/4815* (2013.01); *G01S 17/89* (2013.01); *G03B 37/00* (2013.01); *H04N 5/23238* (2013.01)

(58) Field of Classification Search
None
See application file for complete search history.

(56) References Cited

U.S. PATENT DOCUMENTS

| | | |
|---|---|---|
| 6,192,196 B1 | 2/2001 | Keller |
| 10,506,217 B2 | 12/2019 | Linde et al. |
| 2008/0151264 A1 | 6/2008 | Spencer |

(Continued)

OTHER PUBLICATIONS

International Search Report and Written Opinion for International Patent Application Serial No. PCT/US2019/053040 dated Apr. 22, 2021, 15 pages.

*Primary Examiner* — Eileen M Adams
(74) *Attorney, Agent, or Firm* — Ahmann Kloke LLP

(57) ABSTRACT

An apparatus comprising a housing, a mount configured to be coupled to a motor to horizontally move the apparatus, a wide-angle lens coupled to the housing, the wide-angle lens being positioned above the mount thereby being along an axis of rotation, the axis of rotation being the axis along which the apparatus rotates, an image capture device within the housing, the image capture device configured to receive two-dimensional images through the wide-angle lens of environment, and a LiDAR device within the housing, the LiDAR device configured to generate depth data based on the environment.

23 Claims, 22 Drawing Sheets

(56) References Cited

U.S. PATENT DOCUMENTS

| | | |
|---|---|---|
| 2014/0267596 A1* | 9/2014 | Geerds ............... H04N 5/23238 |
| | | 348/38 |
| 2016/0198087 A1 | 7/2016 | Georgiev et al. |
| 2017/0198747 A1* | 7/2017 | Chen ....................... F16C 11/06 |
| 2019/0154816 A1* | 5/2019 | Hughes ................... G01S 7/497 |
| 2019/0394441 A1 | 12/2019 | Simek et al. |
| 2020/0054295 A1 | 2/2020 | Joskowicz et al. |

\* cited by examiner

SYSTEM AND METHOD OF CAPTURING AND GENERATING PANORAMIC THREE-DIMENSIONAL IMAGES

CROSS-REFERENCE TO RELATED APPLICATIONS

This application is a continuation of U.S. application Ser. No. 17/137,958, filed Dec. 30, 2020, entitled "SYSTEM AND METHOD OF CAPTURING AND GENERATING PANORAMIC THREE-DIMENSIONAL IMAGES," and claims priority to U.S. Application No. 62/955,414, filed Dec. 30, 2019, entitled "SYSTEM AND METHOD OF CAPTURING AND STITCHING PANORAMIC IMAGES," both of which are incorporated herein by reference.

BACKGROUND

1. Field of the Invention(s)

Embodiments of the present invention(s) are generally related to capturing and stitching panoramic images of scenes in a physical environment.

2. Related Art

The popularity of providing three-dimensional (3D) panoramic images of the physical world has created many solutions that have the capability of capturing multiple two-dimensional (2D) images and creating a 3D image based on the captured 2D images. There exist hardware solutions and software applications (or "apps") capable of capturing multiple 2D images and stitching them into a panoramic image.

Technologies exist for capturing and generating 3D data from a building. However, existing technologies are generally incapable of capturing and generating a 3D rendering of an area with bright light. A window with the sun shining through or an area of a floor or wall with a bright light usually appears as a hole in the 3D rendering, which may require additional post-production work to fill in. This increases the turnaround time and authenticity of the 3D rendering. Furthermore, the outdoor environment also provides a challenge for many existing 3D capture device because structure light may not be utilized to capture 3D images.

Other limitations of existing technologies for capturing and generating 3D data include the amount of time required to capture and process the digital images required to produce a 3D panoramic image.

SUMMARY

An example apparatus comprises a housing and a mount configured to be coupled to a motor to horizontally move the apparatus, a wide-angle lens coupled to the housing, the wide-angle lens being positioned above the mount thereby being along an axis of rotation, the axis of rotation being the axis along which the apparatus rotates when coupled to the motor, an image capture device within the housing, the image capture device configured to receive two-dimensional images through the wide-angle lens of an environment, and a LiDAR device within the housing, the LiDAR device configured to generate depth data based on the environment.

An image capture device may comprise a housing, first motor, a wide-angle lens, an image sensor, a mount, a LiDAR, a second motor, and a mirror. The housing may have a front side and a back side. The first motor may be coupled to the housing at a first position between the front side and the back side of the housing, the first motor being configured to horizontally turn the image capture device substantially 270 degrees about a vertical axis. The wide-angle lens may be coupled to the housing at a second position between the front side and the back side of the housing along the vertical axis, the second position being a no-parallax point and the wide-angle lens having a field of view away from the front side of the housing. The image sensor may be coupled to the housing and configured to generate image signals from light received by the wide-angle lens. The mount may be coupled to the first motor. The LiDAR may be coupled to the housing at a third position, the LiDAR configured to generate laser pulses and generate depth signals. The second motor may be coupled to the housing. The mirror may be coupled to the second motor, the second motor may be configured to rotate the mirror around a horizontal axis, the mirror including an angled surface configured to receive the laser pulses from the LiDAR and direct the laser pulses about the horizontal axis.

In some embodiments, the image sensor is configured to generate a first plurality of images at different exposures when the image capture device is stationary and pointed in a first direction. The first motor may be configured to turn the image capture device about the vertical axis after the first plurality of images are generated. In various embodiments, the image sensor does not generate images while the first motor turns the image capture device and wherein the LiDAR generates depth signals based on the laser pulses while the first motor turns the image capture device. The image sensor may be configured to generate a second plurality of images at the different exposures when the image capture device is stationary and pointed in a second direction and the first motor is configured to turn the image capture device 90 degrees about the vertical axis after the second plurality of images are generated. The image sensor may be configured to generate a third plurality of images at the different exposures when the image capture device is stationary and pointed in a third direction and the first motor is configured to turn the image capture device 90 degrees about the vertical axis after the third plurality of images are generated. The image sensor may be configured to generate a fourth plurality of images at the different exposures when the image capture device is stationary and pointed in a fourth direction and the first motor is configured to turn the image capture device 90 degrees about the vertical axis after the fourth plurality of images are generated.

In some embodiments, the system may further comprise a processor configured to blend frames of the first plurality of images before the image sensor generates the second plurality of images. A remote digital device may be in communication with the image capture device and configured to generate a 3D visualization based on the first, second, third, and fourth plurality of images and the depth signals, the remote digital device being configured to generate the 3D visualization using no more images than the first, second, third, and fourth plurality of images. In some embodiments, the first, second, third, and fourth plurality of images are generated between turns that combined turns turning the image capture device 270 degrees around the vertical axis. The speed or rotation of the mirror around the horizontal axis increases as the first motor turns the image capture device. The angled surface of the mirror may be 90 degrees. In some embodiments, the LiDAR emits the laser pulses in a direction that is opposite the front side of the housing.

An example method comprises receiving light from a wide-angle lens of an image capture device, the wide-angel lens being coupled to a housing of the image capture device, the light being received at a field of view of the wide-angle lens, the field of view extending away from a front side of the housing, generating a first plurality of images by an image sensor of an image capture device using the light from the wide-angle lens, the image sensor being coupled to the housing, the first plurality of images being at different exposures, horizontally turning the image capture device by a first motor substantially 270 degrees about a vertical axis, the first motor being coupled to the housing in a first position between the front side and a back side of the housing, the wide-angle lens being at a second position along the vertical axis, the second position being a no-parallax point, rotating a mirror with an angled surface around horizontal axis by a second motor, the second motor being coupled to the housing, generating laser pulses by a LiDAR, the LiDAR being coupled to the housing at a third position, the laser pulse being directed to the rotating mirror while the image capture device horizontally turns, and generating depth signals by the LiDAR based on the laser pulses.

Generating the first plurality of images by the image sensor may occur before the image captured device horizontally turns. In some embodiments, the image sensor does not generate images while the first motor turns the image capture device and wherein the LiDAR generates the depth signals based on the laser pulses while the first motor turns the image capture device.

The method may further comprise generating a second plurality of images at the different exposures by the image sensor when the image capture device is stationary and pointed in a second direction and turning the image capture device 90 degrees about the vertical axis by the first motor after the second plurality of images are generated.

In some embodiments, the method may further comprise generating a third plurality of images at the different exposures by the image sensor when the image capture device is stationary and pointed in a third direction and turning the image capture device 90 degrees about the vertical axis by the first motor after the third plurality of images are generated. The method may further comprise generating a fourth plurality of images at the different exposures by the image sensor when the image capture device is stationary and pointed in a fourth direction. The method may comprise generating a 3D visualization using the first, second, third, and fourth plurality of images and based on the depth signals, the generating the 3D visualization not using any other images.

In some embodiments, the method may further comprise blending frames of the first plurality of images before the image sensor generates the second plurality of images. The first, second, third, and fourth plurality of images may be generated between turns that combined turns turning the image capture device 270 degrees around the vertical axis. In some embodiments, a speed or rotation of the mirror around the horizontal axis increases as the first motor turns the image capture device.

DETAILED DESCRIPTION

Figure 1A:
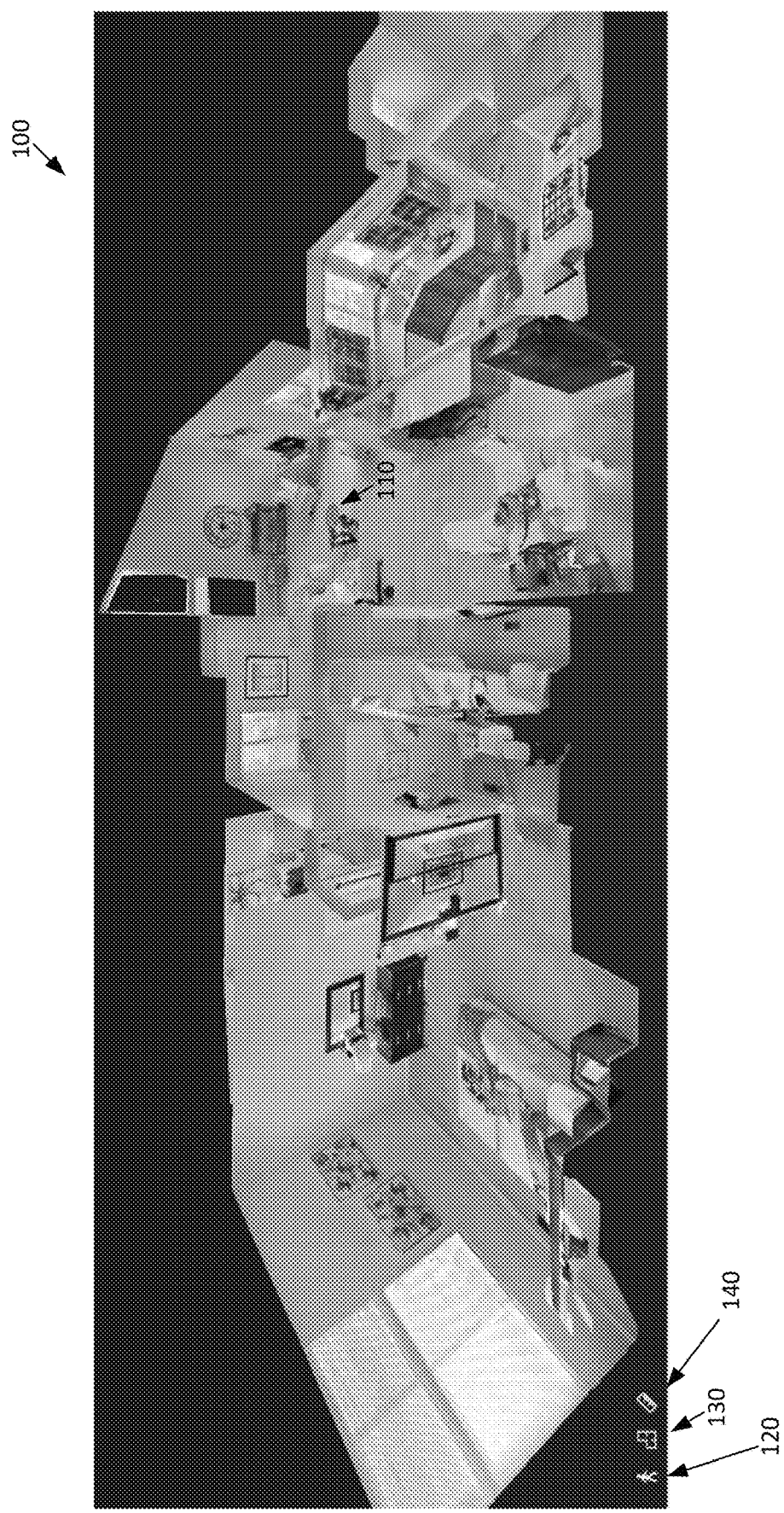
FIG. 1a depicts a dollhouse view of an example environment, such as a house, according to some embodiments.

Many of the innovations described herein are made with reference to the drawings. Like reference numerals are used to refer to like elements. In the following description, for purposes of explanation, numerous specific details are set forth in order to provide a thorough understanding. It may be evident, however, that different innovations can be practiced without these specific details. In other instances, well-known structures and components are shown in block diagram form in order to facilitate describing the innovations.

Various embodiments of the apparatus provide users with 3D panoramic images of indoor as well as outdoor environments. In some embodiments, the apparatus may efficiently and quickly provide users with 3D panoramic images of indoor and outdoor environments using a single wide field-of-view (FOV) lens and a single light and detection and ranging sensors (LiDAR sensor).

The following is an example use case of an example apparatus described herein. The following use case is of one of the embodiments. Different embodiments of the apparatus, as discussed herein, may include one or more similar features and capabilities as that of the use case.

Figure 1B:
FIG. 1B depicts a floorplan view of the first floor of the house according to some embodiments.

FIG. 1a depicts a dollhouse view 100 of an example environment, such as a house, according to some embodiments. The dollhouse view 100 gives an overall view of the example environment captured by an environment capture system (discussed herein). A user may interact with the dollhouse view 100 on a user system by toggling between different views of the example environment. For example, the user may interact with area 110 to trigger a floorplan view of the first floor of the house, as seen in FIG. 1B. In some embodiments, the user may interact with icons in the dollhouse view 100, such as icons 120, 130, and 140, to provide a walkthrough view (e.g., for a 3D walkthrough), a floorplan view, or a measurement view, respectively.

Figure 2:
FIG. 2 depicts an example eye-level view of the living room which may be part of a virtual walkthrough.

FIG. 1B depicts a floorplan view of the first floor of the house according to some embodiments. The floorplan view is a top-down view of the first floor of the house. The user may interact with areas of the floorplan view, such as the area 150, to trigger an eye-level view of a particular portion of the floorplan, such as a living room. An example of the eye-level view of the living room can be found in FIG. 2 which may be part of a virtual walkthrough.

The user may interact with a portion of the floorplan 200 corresponding to the area 150 of FIG. 1B. The user may move a view around the room as if the user was actually in the living room. In addition to a horizontal 360° view of the living room, the user may also view or navigate the floor or ceiling of the living room. Furthermore, the user may traverse the living room to other parts of the house by interacting with particular areas of the portion of the floorplan 200, such as areas 210 and 220. When the user interacts with the area 220, the environment capture system may provide a walking-style transition between the area of the house substantially corresponding to the region of the house depicted by area 150 to an area of the house substantially corresponding to the region of the house depicted by the area 220.

Figure 3:
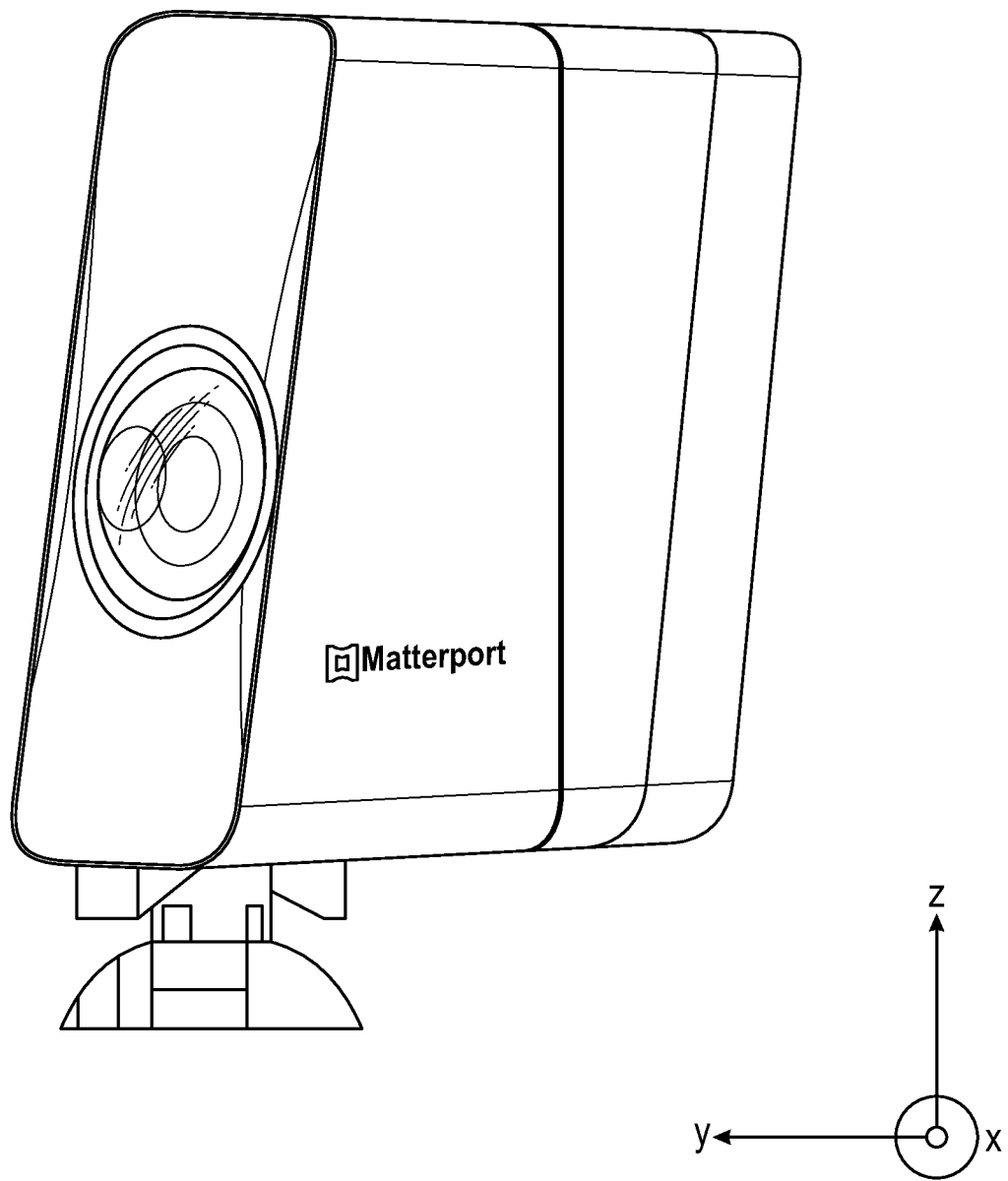
FIG. 3 depicts one example of an environment capture system according to some embodiments.

FIG. 3 depicts one example of an environment capture system 300 according to some embodiments. The environment capture system 300 includes lens 310, a housing 320, a mount attachment 330, and a moveable cover 340.

When in use, the environment capture system 300 may be positioned in an environment such as a room. The environment capture system 300 may be positioned on a support (e.g., tripod). The moveable cover 340 may be moved to reveal a LiDAR and spinnable mirror. Once activated, the environment capture system 300 may take a burst of images and then turn using a motor. The environment capture system 300 may turn on the mount attachment 330. While turning, the LiDAR may take measurements (while turning, the environment capture system may not take images). Once directed to a new direction, the environment capture system may take another burst of images before turning to the next direction.

For example, once positioned, a user may command the environment capture system 300 to start a sweep. The sweep may be as follows:
(1) Exposure estimation and then take HDR RGB images
Rotate 90 degrees capturing depth data
(2) Exposure estimation and then take HDR RGB images
Rotate 90 degrees capturing depth data
(3) Exposure estimation and then take HDR RGB images
Rotate 90 degrees capturing depth data
(4) Exposure estimation and then take HDR RGB images
Rotate 90 degrees (total 360) capturing depth data For each burst, there may be any number of images at different exposures. The environment capture system may blend any number of the images of a burst together while waiting for another frame and/or waiting for the next burst.

The housing 320 may protect the electronic components of the environment capture system 300 and may provide an interface for user interaction, with a power button, a scan button, and others. For example, the housing 320 may include the moveable cover 340, which may be moveable to uncover the LiDAR. Furthermore, the housing 320 may include electronic interfaces, such as a power adapter and indicator lights. In some embodiments, the housing 320 is a molded plastic housing. In various embodiments, the housing 320 is a combination of one or more of plastic, metal, and polymer.

The lens 310 may be a part of a lens assembly. Further details of the lens assembly may be described in the description of FIG. 7. The lens 310 is strategically placed at a center of an axis of rotation 305 of the environment capture system 300. In this example, the axis of rotation 305 is on the x-y plane. By placing the lens 310 at the center of the axis of rotation 305, a parallax effect may be eliminated or reduced. Parallax is an error that arises due to the rotation of the image capture device about a point that is not a non-parallax point (NPP). In this example, the NPP can be found in the center of the l'ns's entrance pupil.

For example, assuming that a panoramic image of the physical environment is generated based on four images captured by the environment capture system 300 with a 25% overlap between images of the panoramic image. If there is no parallax, then 25% of one image may overlap exactly with another image of the same area of the physical environment. Eliminating or reducing the parallax effect of the multiple images captured by an image sensor through the lens 310 may aid in stitching multiple images into a 2D panoramic image.

The lens 310 may include a large field of view (e.g., lens 310 may be a fisheye lens). In some embodiments, the lens may have a horizontal FOV (HFOV) of at least 148 degrees and a vertical FOV (VFOV) of at least 94 degrees.

The mount attachment 330 may allow the environment capture system 300 to be attached to a mount. The mount may allow for the environment capture system 300 to be coupled with a tripod, flat surface, or motorized mount (e.g., to move the environment capture system 300). In some embodiments, the mount may allow the environment capture system 300 to rotate along a horizontal axis.

In some embodiments, the environment capture system 300 may include a motor for turning the environment capture system 300 horizontally about the mount attachment 330.

In some embodiments, a motorized mount may move the environment capture system 300 along a horizontal axis, vertical axis, or both. In some embodiments, the motorized mount may rotate or move in the x-y plane. The use of a mount attachment 330 may allow for the environment capture system 300 to be coupled to a motorized mount, tripod, or the like to stabilize the environment capture system 300 to reduce or minimize shaking. In another example, the mount attachment 330 may be coupled to a motorized mount that allows the 3D, and environment capture system 300 to rotate at a steady, known speed, which aids the LiDAR in determine the (x, y, z) coordinates of each laser pulse of the LiDAR.

Figure 4:
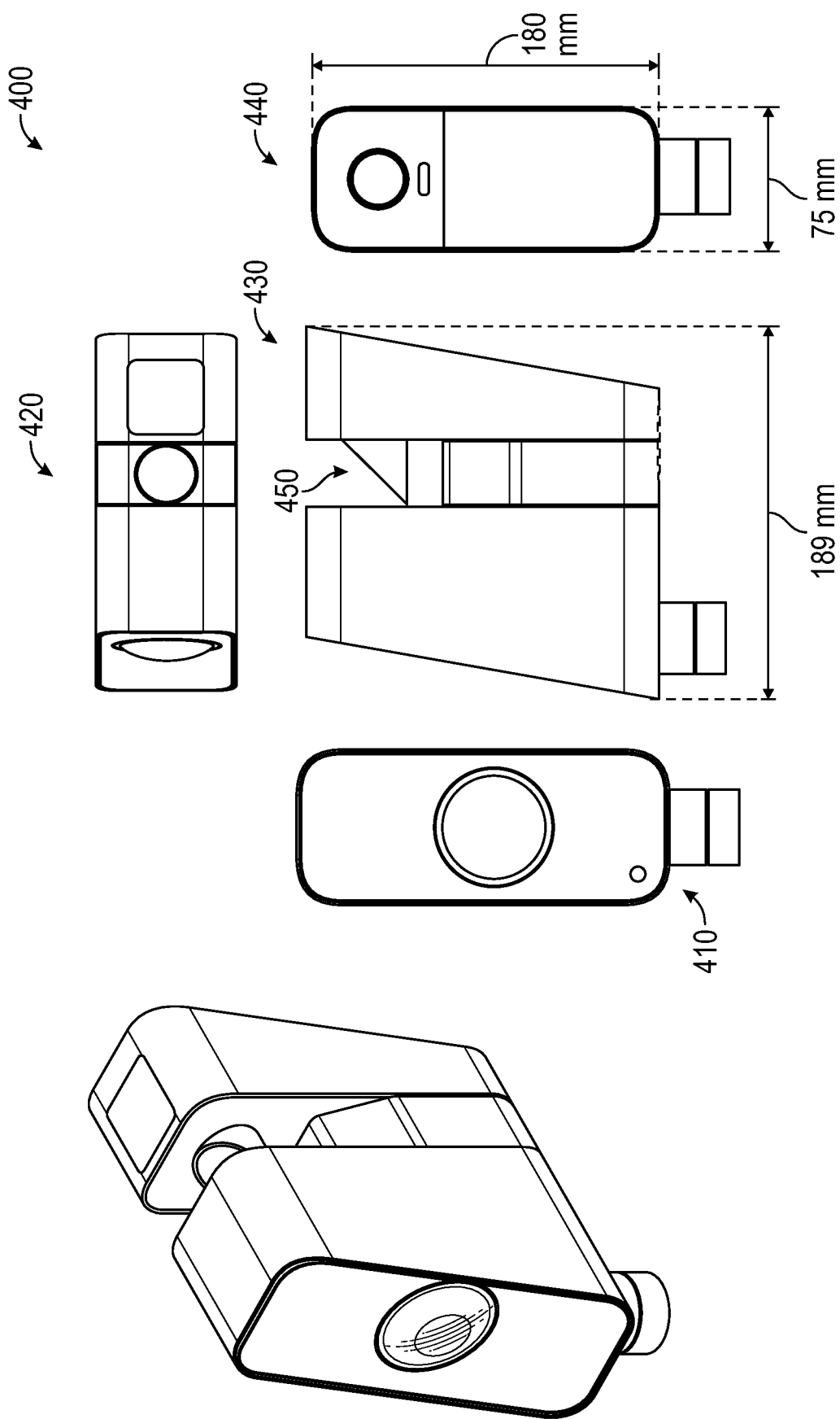
FIG. 4 depicts a rendering of an environment capture system in some embodiments.

FIG. 4 depicts a rendering of a environment capture system 400 in some embodiments. The rendering shows the environment capture system 400 (which may be an example of the environment capture system 300 of FIG. 3) from a variety of views, such as a front view 410, a top view 420, a side view 430, and a back view 440. In these renderings, the environment capture system 400 may include an optional hollow portion depicted in the side view 430.

In some embodiments, the environment capture system 400 has a width of 75 mm, a height of 180 mm, and a depth of 189 mm. It will be appreciated that the environment capture system 400 may have any width, height, or depth. In various embodiments, the ratio of width to height to depth in the first example is maintained regardless of the specific measurements.

The housing of the 3D and 4environment capture system 400 may protect the electronic components of the environment capture system 400 and may provide an interface (e.g., screen on back view 440) for user interaction. Furthermore, the housing may include electronic interfaces, such as a power adapter and indicator lights. In some embodiments, the housing is a molded plastic housing. In various embodiments, the housing is a combination of one or more of plastic, metal, and polymer. The environment capture system 400 may include a moveable cover, which may be moveable to uncover the LiDAR and protect the LiDAR from the elements when not in use.

The lens depicted on the front view 410 may be a part of a lens assembly. Like the environment capture system 300, the lens of the environment capture system 400 is strategically placed at a center of an axis of rotation. The lens may include a large field of view. In various embodiments, the lens depicted on the front view 410 is recessed and the housing is flared such that the wide-angel lens is directly at the no-parallax point (e.g., directly above a mid-point of the mount and/or motor) but still may take images without interference from the housing.

The mount attachment at the base of the environment capture system 400 may allow the environment capture system to be attached to a mount. The mount may allow for the environment capture system 400 to be coupled with a tripod, flat surface, or motorized mount (e.g., to move the environment capture system 400). in some embodiments, the mount may be coupled to an internal motor for turning the environment capture system 400 about the mount.

In some embodiments, the mount may allow the environment capture system 400 to rotate along a horizontal axis. In various embodiments, a motorized mount may move the environment capture system 400 along a horizontal axis, vertical axis, or both. The use of a mount attachment may allow for the environment capture system 400 to be coupled to a motorized mount, tripod, or the like to stabilize the environment capture system 400 to reduce or minimize shaking. In another example, the mount attachment may be coupled to a motorized mount that allows the environment capture system 400 to rotate at a steady, known speed, which aids the LiDAR in determining the (x, y, z) coordinates of each laser pulse of the LiDAR.

In view 430, a mirror 450 is revealed. A LiDAR may emit a laser pulse to the mirror (in a direction that is opposite the lens view). The laser pulse may hit the mirror 450 which may be angled (e.g., at a 90 degree angle) The mirror 450 may be coupled to an internal motor that turns the mirror such at the laser pulses of the LiDAR may be emitted and/or received at many different angles around the environment capture system 400.

Figure 5:
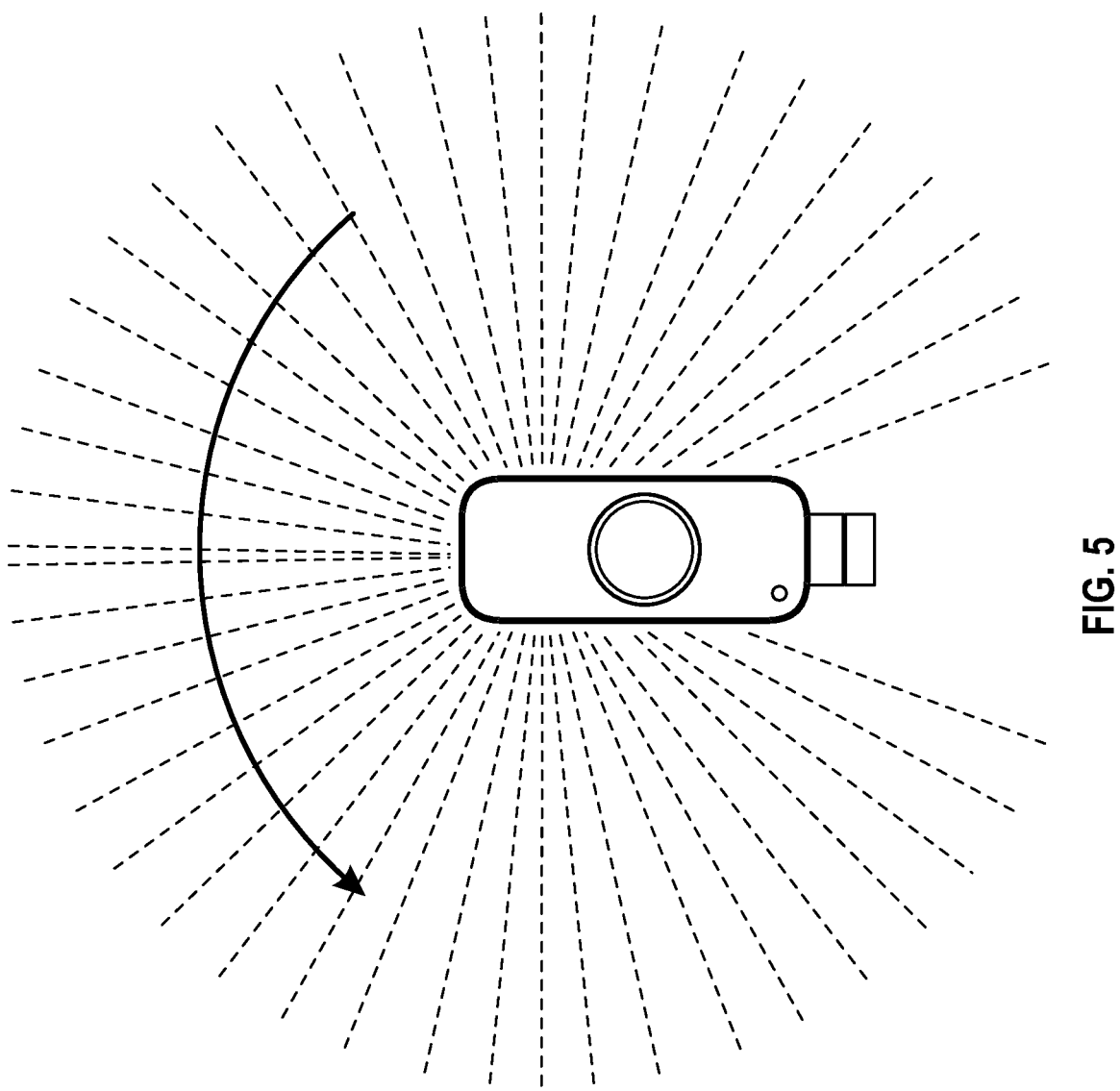
FIG. 5 is a depiction of the laser pulses from the LiDAR about the environment capture system in some embodiments.

FIG. 5 is a depiction of the laser pulses from the LiDAR about the environment capture system 400 in some embodiments. In this example, the laser pulses are emitted at the spinning mirror 450. The laser pulses may be emitted and received perpendicular to a horizontal axis 602 (see FIG. 6) of the environment capture system 400. The mirror 450 may be angled such that laser pulses from the LiDAR are directed away from the environment capture system 400. In some examples, the angle of the angled surface of the mirror may be 90 degrees or be at or between 60 degree to 120 degrees.

In some embodiments, while the environment capture system 400 is stationary and in operation, the environment capture system 400 may take a burst of images through the lens. The environment capture system 400 may turn on a horizontal motor between bursts of images. While turning along the mount, the LiDAR of the environment capture system 400 may emit and/or receive laser pulses which hit the spinning mirror 450. The LiDAR may generate depth signals from the received laser pulse reflections and/or generate depth data.

In some embodiments, the depth data may be associated with coordinates about the environment capture system 400. Similarly, pixels or parts of images may be associated with the coordinates about the environment capture system 400 to enable the creation of the 3D visualization (e.g., an image from different directions, a 3D walkthrough, or the like) to be generated using the images and the depth data.

As shown in FIG. 5, the LiDAR pulses may be blocked by the bottom portion of the environment capture system 400. It will be appreciated that the mirror 450 may spin consistently while the environment capture system 400 moves about the mount or the mirror 450 may spin more slowly when the environment capture system 400 starts to move and again when the environment capture system 400 slows to stop (e.g., maintaining a constant speed between the starting and stopping of the mount motor).

The LiDAR may receive depth data from the pulses. Due to movement of the environment capture system 400 and/or the increase or decrease of the speed of the mirror 450, the density of depth data about the environment capture system 400 may be inconsistent (e.g., more dense in some areas and less dense in others).

Figure 6A:
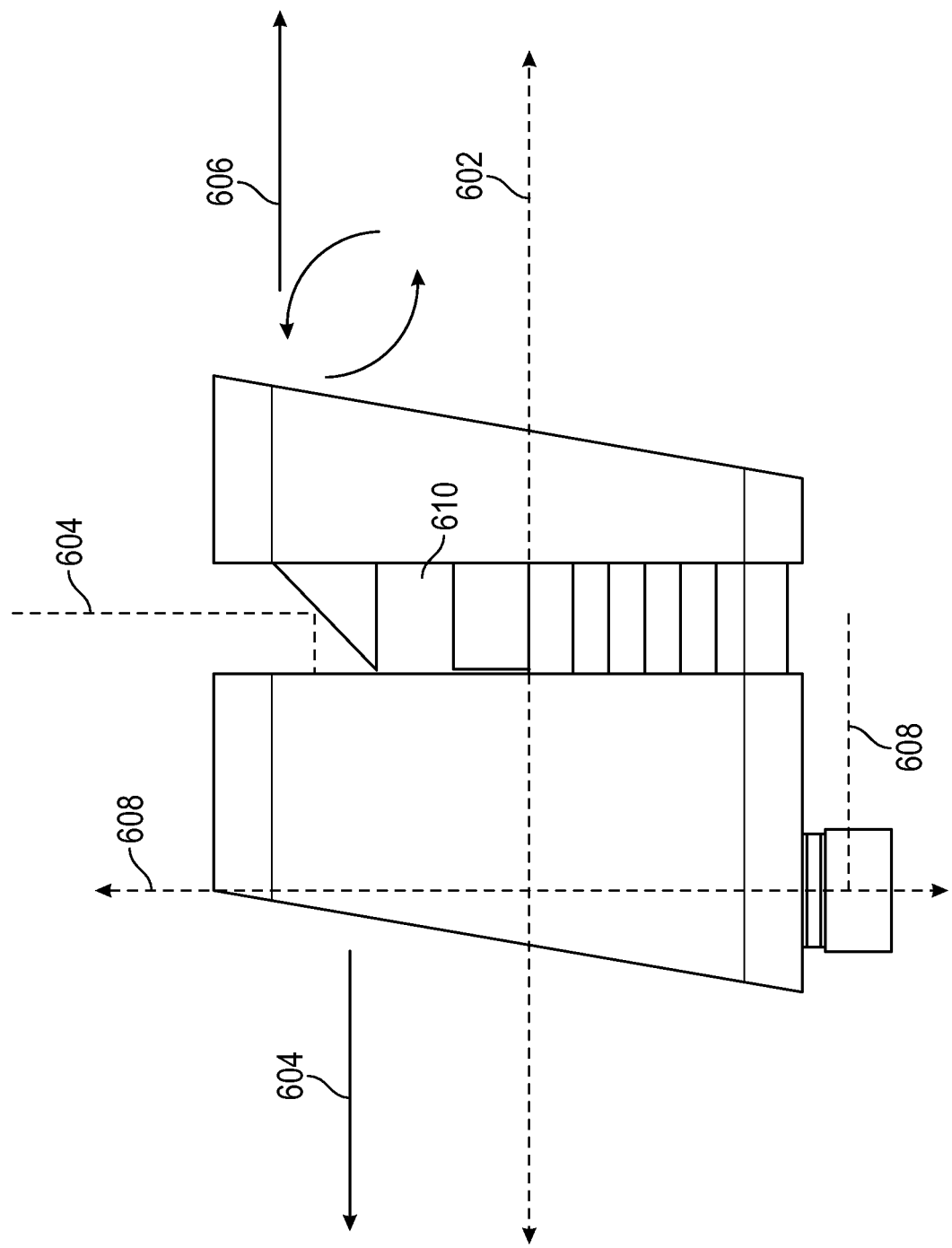
FIG. 6a depicts a side view of the environment capture system.

FIG. 6a depicts a side view of the environment capture system 400. In this view, the mirror 450 is depicted and may spin about a horizontal axis. The pulse 604 may be emitted by the LiDAR at the spinning mirror 450 and may be emitted perpendicular to the horizontal axis 602. Similarly, the pulse 604 may be received by the LiDAR in a similar manner.

Although the LiDAR pulses are discussed as being perpendicular to the horizontal axis 602, it will be appreciated that the LiDAR pulses may be at any angle relative to the horizontal axis 602 (e.g., the mirror angle may be at any angle including between 60 to 120 degrees). In various embodiments, the LiDAR emits pulses opposite a front side (e.g., front side 604) of the environment capture system 400 (e.g., in a direction opposite of the center of the field of view of the lens or towards the back side 606).

As discussed herein, the environment capture system 400 may turn about vertical axis 608. In various embodiments, the environment capture system 400 takes images and then turns 90 degrees, thereby taking a fourth set of images when the environment capture system 400 completes turning 270 degrees from the original starting position where the first set of images was taken. As such, the environment capture system 400 may generate four sets of images between turns totaling 270 degrees (e.g., assuming that the first set of images was taken before the initial turning of the environment capture system 400). In various embodiments, the images from a single sweep (e.g., the four sets of images) of the environment capture system 400 (e.g., taken in a single full rotation or a rotation of 270 degrees about the vertical axis) is sufficient along with the depth data acquired during the same sweep to generate the 3D visualization without any additional sweeps or turns of the environment capture system 400.

It will be appreciated that, in this example, LiDAR pulses are emitted and directed by the spinning mirror in a position that is distant from the point of rotation of the environment capture system 400. In this example, the distance from the point of rotation of the mount is 608 (e.g., the lens may be at the no-parallax point while the lens may be in a position behind the lens relative to the front of the environment capture system 400). Since the LiDAR pulses are directed by the mirror 450 at a position that is off the point of rotation, the LiDAR may not receive depth data from a cylinder running from above the environment capture system 400 to below the environment capture system 400. In this example, the radius of the cylinder (e.g., the cylinder being a lack of depth information) may be measured from the center of the point of rotation of the motor mount to the point where the mirror 450 directs the LiDAR pulses.

Figure 6B:
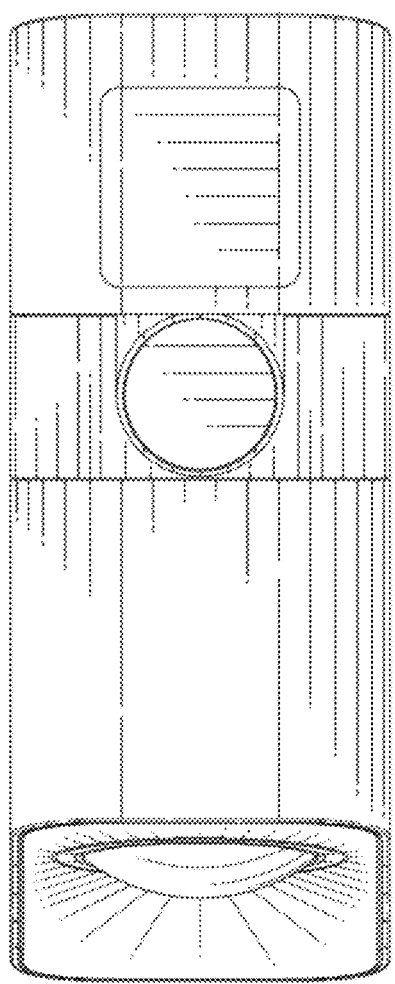
FIG. 6b depicts a view from above the environment capture system in some embodiments.

Further, in FIG. 6b, cavity 610 is depicted. In this example, the environment capture system 400 includes the spinning mirror within the body of the housing of the environment capture system 400. There is a cut-out section from the housing. The laser pulses may be reflected by the mirror out of the housing and then reflections may be received by the mirror and directed back to the LiDAR to enable the LiDAR to create depth signals and/or depth data. The base of the body of the environment capture system 400 below the cavity 610 may block some of the laser pulses. The cavity 610 ma be defined by the base of the environment capture system 400 and the rotating mirror. As depicted in FIG. 6b, there may still be a space between an edge of the angled mirror and the housing of the environment capture system 400 containing the LiDAR.

In various embodiments, the LiDAR is configured to stop emitting laser pulses if the speed of rotation of the mirror drops below a rotating safety threshold (e.g., if there is a failure of the motor spinning the mirror or the mirror is held in place). In this way, the LiDAR may be configured for safety and reduce the possibility that a laser pulse will continue to be emitted in the same direction (e.g., at a user's eyes).

FIG. 6b depicts a view from above the environment capture system 400 in some embodiments. In this example, the front of the environment capture system 400 is depicted with the lens recessed and above directly above the center of the point of rotation (e.g., above the center of the mount). The front of the camera is recessed for the lends and the front of the housing is flared to allow the field of view of the image sensor to be unobstructed by the housing. The mirror 450 is depicted as pointing upwards.

Figure 7:
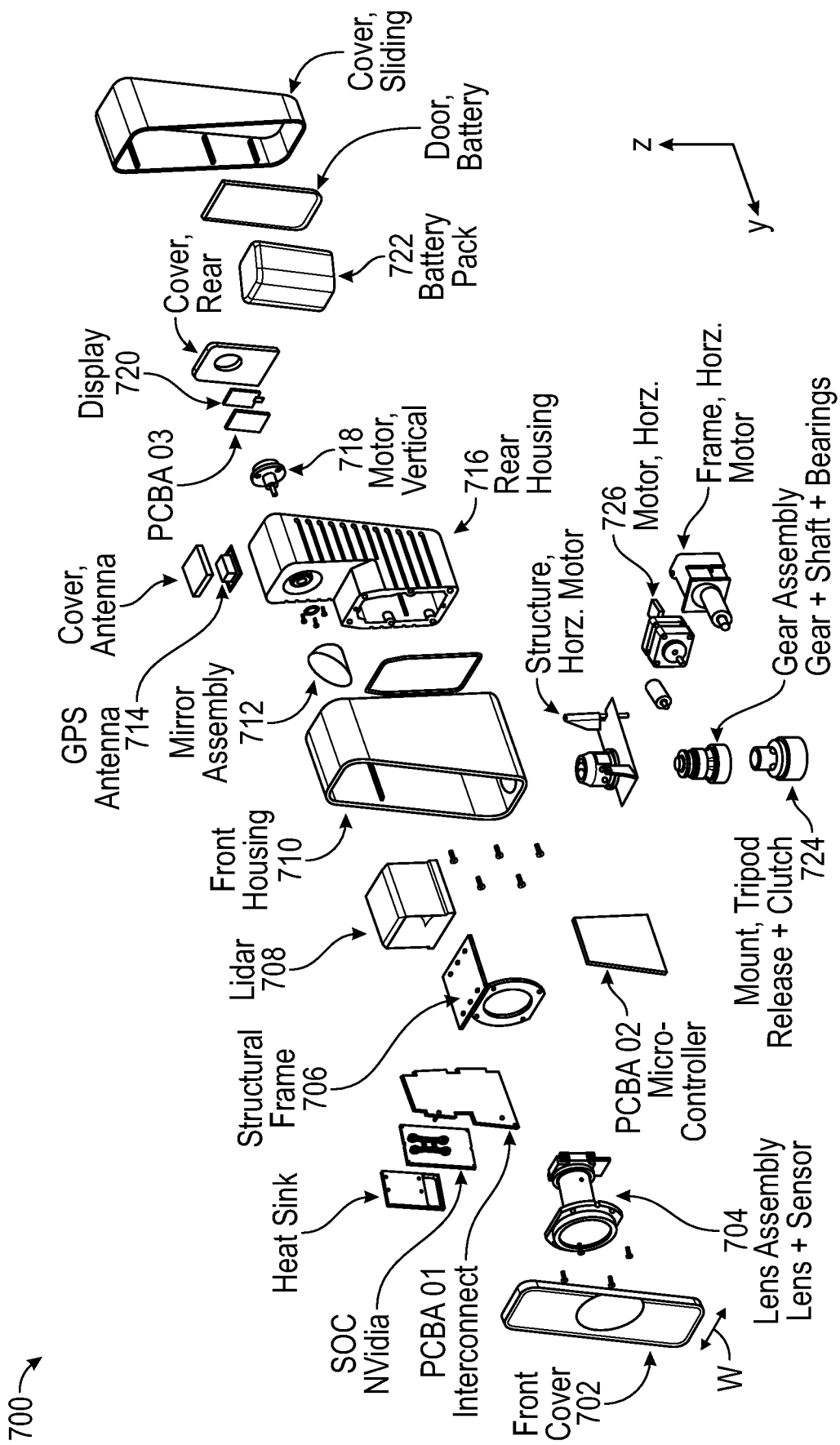
FIG. 7 depicts a rendering of the components of one example of the environment capture system according to some embodiments.

FIG. 7 depicts a rendering of the components of one example of the environment capture system 300 according to some embodiments. The environment capture system 700 includes a front cover 702, a lens assembly 704, a structural frame 706, a LiDAR 708, a front housing 710, a mirror assembly 712, a GPS antenna 714, a rear housing 716, a vertical motor 718, a display 720 a battery pack 722, a mount 724, and a horizontal motor 726.

In various embodiments, the environment capture system 700 may be configured to scan, align, and create 3D mesh outdoors in full sun as well as indoors. This removes a barrier to the adoption of other systems which are an indoor-only tool. The environment capture system 700 may be able to scan large spaces more quickly than other devices. The environment capture system 700 may, in some embodiments, provide an improved depth accuracy by improving single scan depth accuracy at 90 m.

In some embodiments, the environment capture system 700 may weigh 1 kg or about 1 kg. In one example, the environment capture system 700 may weigh between 1-3 kg.

The front cover 702, the front housing 710, and the rear housing 716 make up a part of the housing. In one example, the front cover may have a width, w, of 75 mm.

Figure 8A:
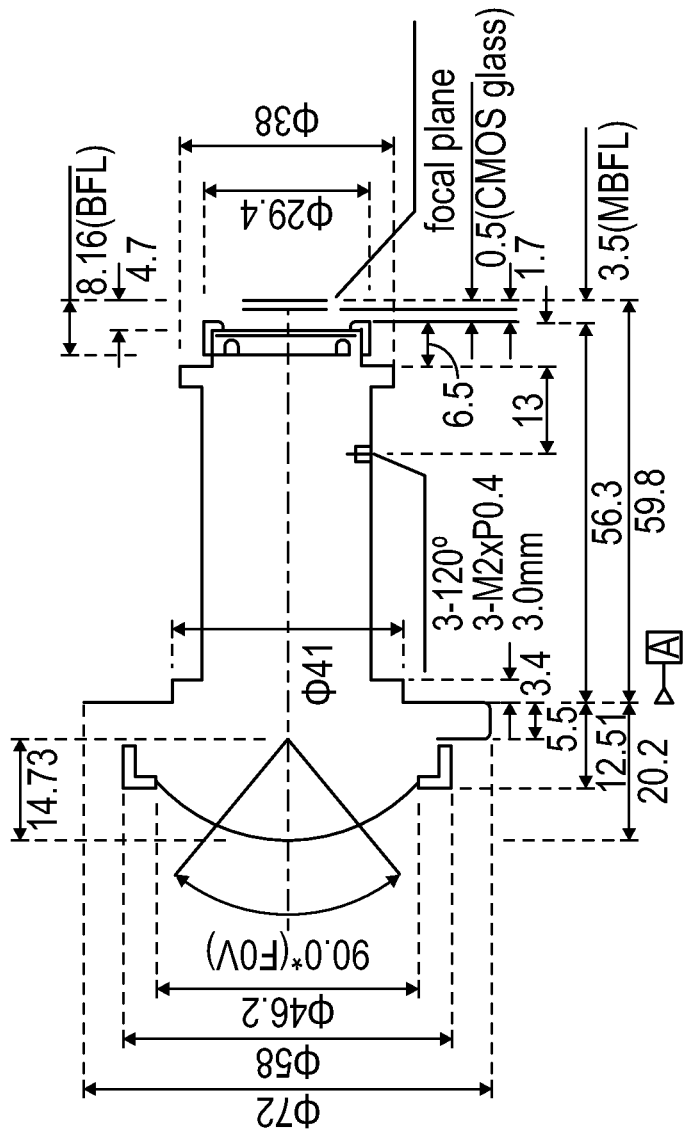
FIG. 8a depicts example lens dimensions in some embodiments.
Figure 8A:
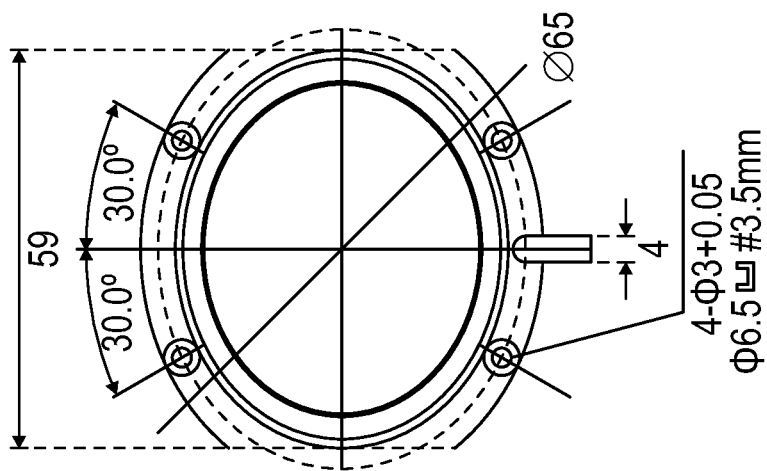

The lens assembly 704 may include a camera lens that focuses light onto an image capture device. The image capture device may capture an image of a physical environment. The user may place the environment capture system 700 to capture one portion of a floor of a building, such as the second building 422 of FIG. 1 to obtain a panoramic image of the one portion of the floor. The environment capture system 700 may be moved to another portion of the floor of the building to obtain a panoramic image of another portion of the floor. In one example, the depth of field of the image capture device is 0.5 meters to infinity. FIG. 8a depicts example lens dimensions in some embodiments.

In some embodiments, the image capture device is a complementary metal-oxide-semiconductor (CMOS) image sensor (e.g., a Sony IMX283 ~20 Megapixel CMOS MIPI sensor with the NVidia Jetson Nano SOM). In various embodiments, the image capture device is a charged coupled device (CCD). In one example, the image capture device is a red-green-blue (RGB) sensor. In one embodiment, the image capture device is an infrared (IR) sensor. The lens assembly 704 may be give the image capture device a wide field of view.

The image sensor may have many different specifications. In one example, the image sensor includes the following:

| Pixels per Column | pixels | 5496 |
| Pixels per Row | pixels | 3694 |
| Resolution | MP | >20 |
| Image circle diameter | mm | 15.86 mm |
| Pixel pitch | um | 2.4 um |
| Pixels Per Degree (PPD) | PPD | >37 |
| Chief ray angle at full height | degree s | 3.0° |
| Output Interface | — | MIPI |
| Green Sensitivity | V/lux * s | >1.7 |
| SNR (100 lux, 1x gain) | dB | >65 |
| Dynamic Range | dB | >70 |

Example specifications may be as follows:

| F-number | — | 2.8 |
| Image circle diameter | mm | 15.86 |
| Minimum object distance | mm | 500 |
| Maximum object distance | mm | Infinity |
| Chief ray angle at sensor full height | deg | 3.0 |
| L1 diameter | mm | <60 |
| Total track length (TTL) | mm | <=80 |
| Back Focal Length (BFL) | mm | — |
| Effective Focal Length (EFL) | mm | — |
| Relative illumination | % | >50 |
| Max distortion | % | <5 |
| 52 lp/mm(on-axis) | % | >85 |
| 104 lp/mm (on-axis) | % | >66 |
| 208 lp/mm (on-axis) | % | >45 |
| 52 lp/mm (83% field) | % | >75 |
| 104 lp/mm (83% field) | % | >41 |
| 208 lp/mm (83% field) | % | >25 |

In various embodiments, in looking at the MTF at F0 relative field (i.e., the center), the focus shift may vary from +28 microns at 0.5 m to −25 microns at infinity for a total through focus shift of 53 microns.

Figure 8B:
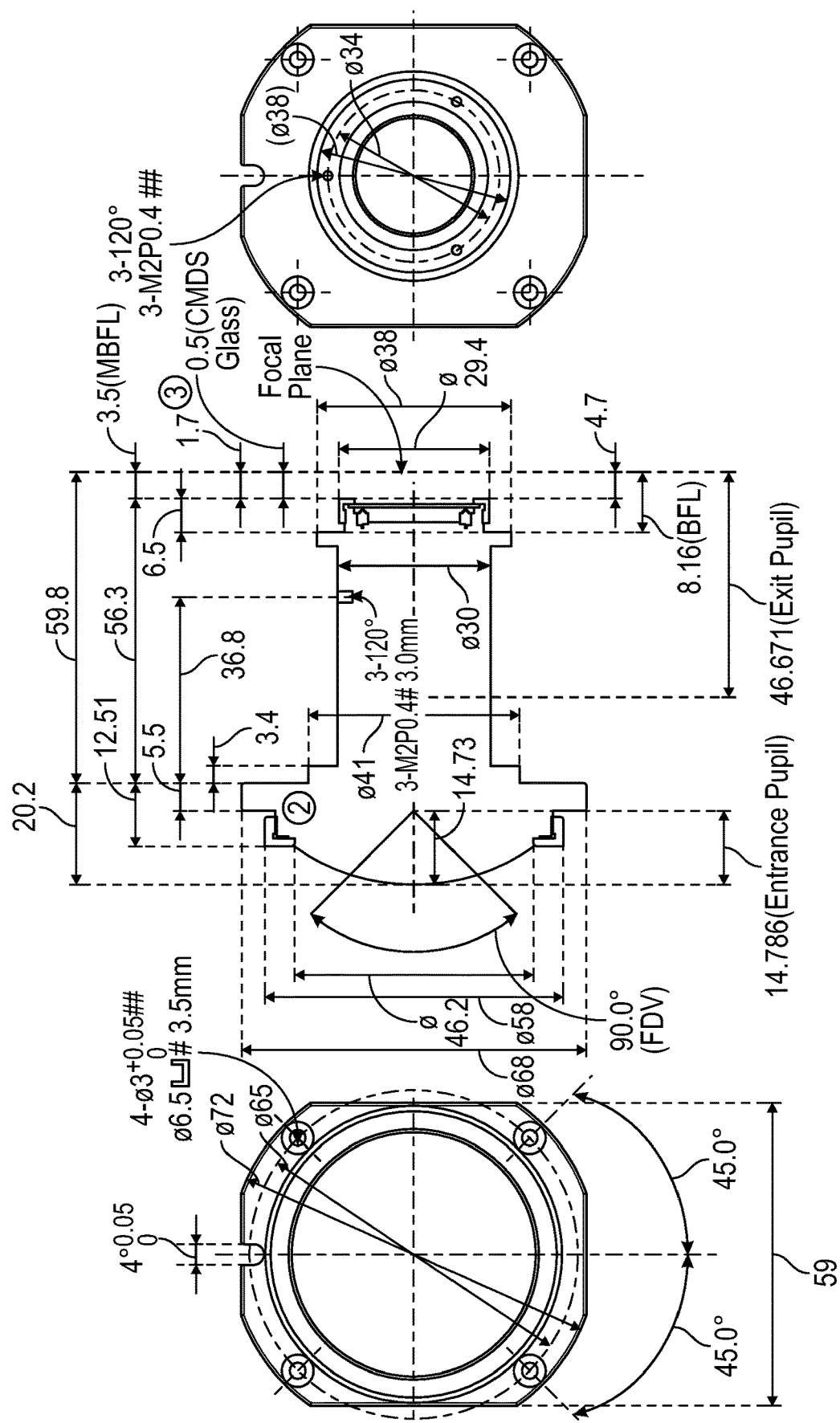
FIG. 8b depicts an example lens design specification in some embodiments.

FIG. 8b depicts example lens design specifications in some embodiments.

In some examples, the lens assembly 704 has an HFOV of at least 148 degrees and a VFOV of at least 94 degrees. In one example, the lens assembly 704 has a field of view of 150°, 180°, or be within a range of 145° to 180°. Image capture of a 360° view around the environment capture system 700 may be obtained, in one example, with three or four separate image captures from the image capture device of environment capture system 700. In various embodiments, the image capture device may have a resolution of at least 37 pixels per degree. In some embodiments, the environment capture system 700 includes a lens cap (not shown) to protect the lens assembly 704 when it is not in use. The output of the lens assembly 704 may be a digital image of one area of the physical environment. The images captured by the lens assembly 704 may be stitched together to form a 2D panoramic image of the physical environment. A 3D panoramic may be generated by combining the depth data captured by the LiDAR 708 with the 2D panoramic image generated by stitching together multiple images from the lens assembly 704. In some embodiments, the images captured by the environment capture system 402 are stitched together by the image processing system 406. In various embodiments, the environment capture system 402 generates a "preview" or "thumbnail" version of a 2D panoramic image. The preview or thumbnail version of the 2D panoramic image may be presented on a user system 1110 such as an iPad, personal computer, smartphone, or the like. In some embodiments, the environment capture system 402 may generate a mini-map of a physical environment representing an area of the physical environment. In various embodiments, the image processing system 406 generates the mini-map representing the area of the physical environment.

The images captured by the lens assembly 704 may include capture device location data that identifies or indicates a capture location of a 2D image. For example, in some implementations, the capture device location data can include a global positioning system (GPS) coordinates associated with a 2D image. In other implementations, the capture device location data can include position information indicating a relative position of the capture device (e.g., the camera and/or a 3D sensor) to its environment, such as a relative or calibrated position of the capture device to an object in the environment, another camera in the environment, another device in the environment, or the like. In some implementations, this type of location data can be determined by the capture device (e.g., the camera and/or a device operatively coupled to the camera comprising positioning hardware and/or software) in association with the capture of an image and received with the image. The placement of the lens assembly 704 is not solely by design. By placing the lens assembly 704 at the center, or substantially at the center, of the axis of rotation, the parallax effect may be reduced.

In some embodiments, the structural frame 706 holds the lens assembly 704 and the LiDAR 708 in a particular position and may help protect the components of the example of the environment capture system. The structural frame 706 may serve to aid in rigidly mounting the LiDAR 708 and place the LiDAR 708 in a fixed position. Furthermore, the fixed position of the lens assembly 704 and the LiDAR 708 enable a fixed relationship to align the depth data with the image information to assist with creating the 3D images. The 2D image data and depth data captured in the physical environment can be aligned relative to a common 3D coordinate space to generate a 3D model of the physical environment.

In various embodiments, the LiDAR 708 captures depth information of a physical environment. When the user places the environment capture system 700 in one portion of a floor of the second building, the LiDAR 708 may obtain depth information of objects. The LiDAR 708 may include an optical sensing module that can measure the distance to a target or objects in a scene by utilizing pulses from a laser to irradiate a target or scene and measure the time it takes photons to travel to the target and return to the LiDAR 708. The measurement may then be transformed into a grid coordinate system by using information derived from a horizontal drive train of the environment capture system 700.

In some embodiments, the LiDAR 708 may return depth data points every 10 useconds with a timestamp (of an internal clock). The LiDAR 708 may sample a partial sphere (small holes at top and bottom) every 0.25 degrees. In some embodiments, with a data point every 10 usec and 0.25 degrees, there may be a 14.40 milliseconds per "disk" of points and 1440 disks to make a sphere that is nominally 20.7 seconds. Because each disk captures forward and back, the sphere could be captured in a 180° sweep.

In one example, the LiDAR 708 specification may be as follows:

| | | |
|---|---|---|
| Range (10% reflectance) | m | 90 |
| Range (20% reflectance) | m | 130 |
| Range (100% reflectance) | m | 260 |
| Range Precision (1σ @ 20 m) | cm | 2 |
| Wavelength | nm | 905 |
| Laser Safety | — | Class 1 |
| Point Rate | points/s | 1000,000 |
| Beam Divergence | degrees | 0.28 × 0.03 |
| Angular Resolution | deg | 0.1 |
| Collimated Beam Dimensions (@ 10 cm) | mm | 14.71 × 8.46 |
| Operating Temperature | deg C. | −20 to 65 |
| Power (normal mode, active) | W | 4.83 |
| Power (normal mode, idle) | W | 4.38 |
| Power (standby mode) | W | 4.07 |
| Time to Active from Off | s | 3.898 |
| Time to Active from Standby | s | 0.289 |
| Time to Active from Normal Idle | s | 0.003 |
| Voltage | V | 10-15.6 |
| Data synchronization | — | Pulse Per Second (PPS) |
| Dimensions | mm | 60 × 58 × 56 |
| Weight | g | 230 |
| Data Latency | ms | 2 |
| False Alarm Rate (@ 100 klx) | % | <0.01% |

One advantage of utilizing LiDAR is that with a LiDAR at the lower wavelength (e.g., 905 nm, 900-940 nm, or the like) it may allow the environment capture system 700 to determine depth information for an outdoor environment or an indoor environment with bright light.

The placement of the lens assembly 704 and the LiDAR 708 may allow the environment capture system 700 or a digital device in communication with the environment capture system 700 to generate a 3D panoramic image using the depth data from the LiDAR 708 and the lens assembly 704.

In some embodiments, the 2D and 3D panoramic images are not generated on the environment capture system 402.

The output of the LiDAR 708 may include attributes associated with each laser pulse sent by the LiDAR 708. The attributes include the intensity of the laser pulse, number of returns, the current return number, classification point, RGC values, GPS time, scan angle, the scan direction, or any combination therein. The depth of field may be (0.5 m; infinity), (1 m; infinity), or the like. In some embodiments, the depth of field is 0.2 m to 1 m and infinity.

In some embodiments, the environment capture system 700 captures four separate RBG images using the lens assembly 704 while the environment capture system 700 is stationary. In various embodiments, the LiDAR 708 captures depth data in four different instances while the environment capture system 700 is in motion, moving from one RBG image capture position to another RBG image capture position. In one example, the 3D panoramic image is captured with a 360° rotation of the environment capture system 700, which may be called a sweep. In various embodiments, the 3D panoramic image is captured with a less than 360° rotation of the environment capture system 700. The output of the sweep may be a sweep list (SWL), which includes image data from the lens assembly 704 and depth data from the LiDAR 708 and properties of the sweep, including the GPS location and a timestamp of when the sweep took place. In various embodiments, a single sweep (e.g., a single 360 degree turn of the environment capture system 700) captures sufficient image and depth information to generate a 3D visualization (e.g., by the digital device in communication with the environment capture system 700 that receives the imagery and depth data from the environment capture system 700 and creates the 3D visualization using only the imagery and depth data from the environment capture system 700 captured in the single sweep).

In some embodiments, the images captured by the environment capture system 402 may be blended, stitched together, and combined with the depth data from the LiDAR 708 by an image stitching and processing system discussed herein.

In various embodiments, the environment capture system 402 and/or an application on the user system 1110 may generate a preview or thumbnail version of a 3D panoramic image. The preview or thumbnail version of the 3D panoramic image may be presented on the user system 1110 and may have a lower image resolution than the 3D panoramic image generated by the image processing system 406. After the lens assembly 704 and the LiDAR 708 captures the images and depth data of the physical environment, the environment capture system 402 may generate a mini-map representing an area of the physical environment that has been captured by the environment capture system 402. In some embodiments, the image processing system 406 generates the mini-map representing the area of the physical environment. After capturing images and depth data of a living room of a home using the environment capture system 402, the environment capture system 402 may generate a top-down view of the physical environment. A user may use this information to determine areas of the physical environment in which the user has not captured or generated 3D panoramic images.

Figure 16:
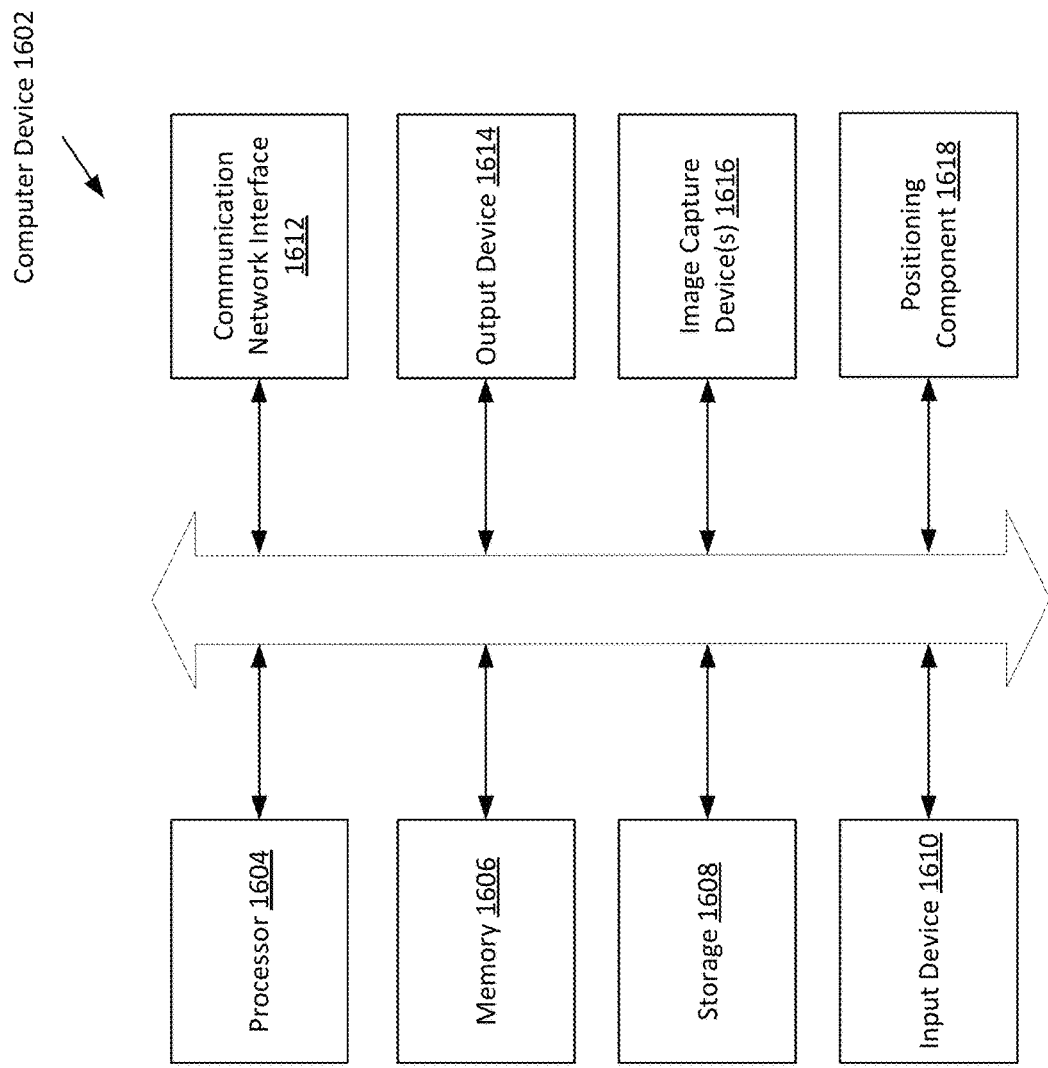
FIG. 16 depicts a block diagram of an example digital device according to some embodiments.

In one embodiment, the environment capture system 700 may interleave image capture with the image capture device of the lens assembly 704 with depth information capture with the LiDAR 708. For example, the image capture device may capture an image of section 1605, as seen in FIG. 16, of the physical environment with the image capture device, and then LiDAR 708 obtains depth information from section 1605. Once the LiDAR 708 obtains depth information from section 1605, the image capture device may move on to capture an image of another section 1610, and then LiDAR 708 obtains depth information from section 1610, thereby interleaving image capture and depth information capture.

In some embodiments, the LiDAR 708 may have a field of view of at least 145°, depth information of all objects in a 360° view of the environment capture system 700 may be obtained by the environment capture system 700 in three or four scans. In another example, the LiDAR 708 may have a field of view of at least 150°, 180°, or between 145° to 180°.

An increase in the field of view of the lens reduces the amount of time required to obtain visual and depth information of the physical environment around the environment capture system 700. In various embodiments, the LiDAR 708 has a minimum depth range of 0.5 m. In one embodiment, the LiDAR 708 has a maximum depth range of greater than 8 meters.

The LiDAR 708 may utilize the mirror assembly 712 to direct the laser in different scan angles. In one embodiment, the optional vertical motor 718 has the capability to move the mirror assembly 712 vertically. In some embodiments, the mirror assembly 712 may be a dielectric mirror with a hydrophobic coating or layer. The mirror assembly 712 may be coupled to the vertical motor 718 that rotates the mirror assembly 712 when in use.

The mirror of the mirror assembly 712 may, for example, include the following specifications:

| Reflectivity @ 905 nm | % | >99 |
| Absorption at Visible Wavelengths (380-700 nm)** | % | >60% |
| Clear Aperture | % | >=85 |
| Laser Damage Threshold @ 905 nm | uJ | >=0.45 |
| Angle of Incidence (AOI) | deg | 45 ± 1 |

The mirror of the mirror assembly 712, may, for example, include the following specification for materials and coatings:

| S1L1 | material | Dielectric | |
| S1L2 | material | Hydrophobic | |
| S2L1 | material | Black Paint Emulsion | Powder suspended in paint |
| Substrate | material | Schott B270I | |

The hydrophobic coating of the mirror of the mirror assembly 712, may, for example, include a Contact Angle deg >105.

The mirror of the mirror assembly 712 may include the following quality specifications:

| Scratch/Dig Standard | 3 |
| HTS: 80 C., 50 hrs. | 3 |
| LTS: −30 C., 1000 hrs. | 3 |
| THS: 60 C./90% RH, 1000 hrs. | 3 |
| TC: −30 to 70 C., 50 cyc (30 min./5 min./30 min.) | 3 |
| (Solvent Resistance), Side a, 50 wipes with ethanol, alcohol, 300 g | |
| (Solvent Resistance), Side b, 10 wipes with ethanol, alcohol, 200 g | 3 |
| (Abrasion Resistance), Side a, 50 wipes, 300 g | |
| (Abrasion Resistance), Side b, 10 wipes, 200 g | 3 |

-continued

| | | |
|---|---|---|
| (Durability), Side a, 10 tape peels (CT-18) | | |
| (Durability), Side b, 5 tape peels (CT-18) | | 3 |
| UV Resistance (Outdoor environment simulation, 340 nm, 0.35 W/m^2/nm irradiance, 306 min light at 125 C. BTP 54 min. light and deionized water spray (uncontrolled temp) 6 h dark at 95% RH, 24 C. (air)) | | 3 |
| Surface Roughness | | >=10 |
| Hydrophobic Contact Angle | | >=10 |

The vertical motor may include, for example, the following specifications:

| | | |
|---|---|---|
| Maximum Speed | RPM | 4000 and 6500 |
| Maximum Acceleration | deg/sec^2 | 300 |
| Durability | Cycle | 7000 |
| Motor Driver | | |

Accuracy 1 revolution time variance standard deviation of <5 μsec

Due to the RGB capture device and the LiDAR 708, the environment capture system 700 may capture images outside in bright sunlight or inside with bright lights or sunlight glare from windows. In systems that utilize different devices (e.g., structured light devices), they may not be able to operate in bright environments, whether inside or outside. Those devices are often limited to use only inside and only during dawn or sunset to control light. Otherwise, bright spots in a room create artifacts or "holes" in images that must be filled or corrected. The environment capture system 700, however, may be utilized in bright sunlight both inside and outside. The capture device and the LiDAR 708 may be able to capture image and depth data in bright environments without artifacts or holes caused by glare or bright light.

In one embodiment, the GPS antenna 714 receives global positioning system (GPS) data. The GPS data may be used to determine the location of the environment capture system 700 at any given time.

In various embodiments, the display 720 allows the environment capture system 700 to provide a current state of the system, such as updating, warming up, scanning, scanning complete, error, and the like.

The battery pack 722 provides power to the environment capture system 700. The battery pack 722 may be removable and rechargeable, thereby allowing a user to put in a fresh battery pack 722 while charging a depleted battery pack. In some embodiments, the battery pack 722 may allow at least 1000 SWLs or at least 250 SWLs of continuous use before recharging. The environment capture system 700 may utilize a USB-C plug for recharging.

In some embodiments, the mount 724 provides a connector for the environment capture system 700 to connect to a platform such as a tripod or mount. The horizontal motor 726 may rotate the environment capture system 700 around an x-y plane. In some embodiments, the horizontal motor 726 may provide information to a grid coordinate system to determine (x, y, z) coordinates associated with each laser pulse. In various embodiments, due to the broad field of view of the lens, the positioning of the lens around the axis of rotation, and the LiDAR device, the horizontal motor 726 may enable the environment capture system 700 to scan quickly.

The horizontal motor 726 may have the following specifications in one example:

| | | |
|---|---|---|
| Maximum Speed | deg/sec | 60 |
| Maximum Acceleration | deg/sec^2 | 300 |
| Maximum Torque | Nm | 0.5 |
| Angular Position Resolution | deg | <0.125 to <0.025 |
| Angular Position Accuracy | deg | <0.1 |
| Encoder Resolution | CPR | 4096 |
| Durability | Cycle | 70,000 |

In various embodiments, the mount 724 may include a quick release adapter. The holding torque may be, for example, >2.0 Nm and the durability of the capture operation may be up to or beyond 70,000 cycles.

For example, the environment capture system 700 may enable construction of a 3D mesh of a standard home with a distance between sweeps greater than 8 m. A time to capture, process, and align an indoor sweep may be under 45 seconds. In one example, a time frame from the start of a sweep capture to when the user can move the environment capture system 700 may be less than 15 seconds.

In various embodiments, these components provide the environment capture system 700 the ability to align scan positions outdoor as well as indoor and therefore create seamless walk-through experiences between indoor and outdoor (this may be a high priority for hotels, vacation rentals, real estate, construction documentation, CRE, and as-built modeling and verification. The environment capture system 700 may also create an "outdoor dollhouse" or outdoor mini-map. The environment capture system 700, as shown herein, may also improve the accuracy of the 3D reconstruction, mainly from a measurement perspective. For scan density, the ability for the user to tune it may also be a plus. These components may also enable the environment capture system 700 the ability to capture wide empty spaces (e.g., longer range). In order to generate a 3D model of wide empty spaces may require the environment capture system to scan and capture 3D data and depth data from a greater distance range than generating a 3D model of smaller spaces.

In various embodiments, these components enable the environment capture system 700 to align SWLs and reconstruct the 3D model in a similar way for indoor as well as outdoor use. These components may also enable the environment capture system 700 to perform geo-localization of 3D models (which may ease integration to Google street view and help align outdoor panoramas if needed).

The image capture device of the environment capture system 700 may be able to provide a DSLR-like Image with quality printable at 8.5"×11" for 70° VFOV and an RGB image style.

In some embodiments, the environment capture system 700 may take an RGB image with the image capture device (e.g., using the wide-angle lens) and then move the lens before taking the next RGB image (for a total of four movements using the motor). While the horizontal motor 726 rotates the environment capture system 90 degrees, the LiDAR 708 may capture depth data. In some embodiments, the LiDAR 708 includes an APD array.

In some embodiments, the image and depth data may then be sent to a capture application (e.g., a device in communication with the environment capture system 700, such as a smart device or an image capture system on a network). In some embodiments, the environment capture system 700 may send the image and depth data to the image processing system 406 for processing and generating the 2D panoramic image or the 3D panoramic image. In various embodiments, the environment capture system 700 may generate a sweep list of the captured RGB image and the depth data from a 360-degree revolution of the environment capture system 700. The sweep list may be sent to the image processing system 406 for stitching and aligning. The output of the sweep may be a SWL, which includes image data from the lens assembly 704 and depth data from the LiDAR 708 and properties of the sweep, including the GPS location and a timestamp of when the sweep took place.

In various embodiments, the LIDAR, vertical mirror, RGB lens, tripod mount, and horizontal drive are rigidly mounted within the housing to allow the housing to be opened without requiring the system to be recalibrated.

Figure 9A:
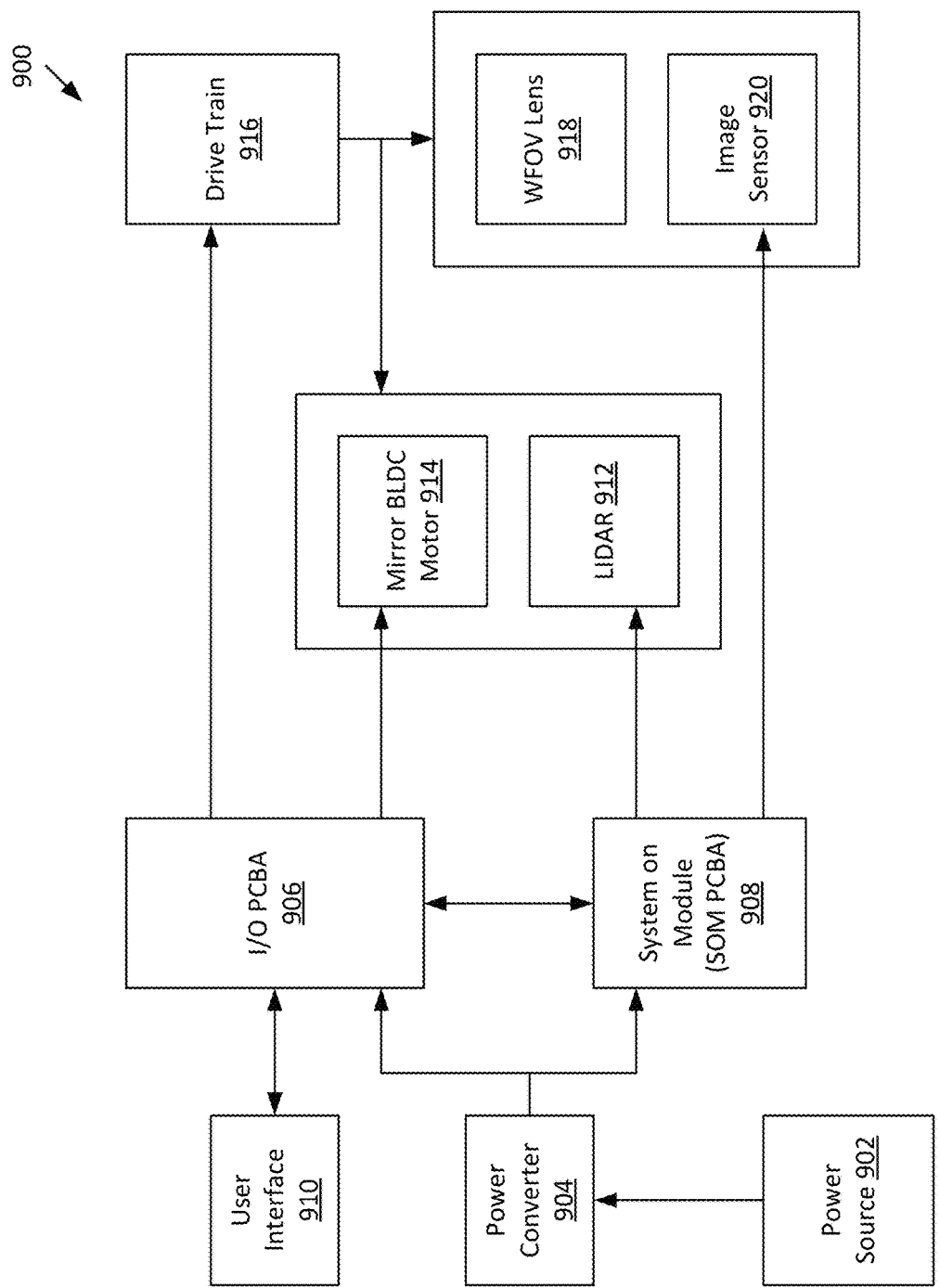
FIG. 9a depicts a block diagram of an example of an environment capture system according to some embodiments.

FIG. 9a depicts a block diagram 900 of an example of an environment capture system according to some embodiments. The block diagram 900 includes a power source 902, a power converter 904, an input/output (I/O) printed circuit board assembly (PCBA), a system on module (SOM) PCBA, a user interface 910, a LiDAR 912, a mirror brushless direct current (BLCD) motor 914, a drive train 916, wide FOV (WFOV) lens 918, and an image sensor 920.

The power source 902 may be the battery pack 722 of FIG. 7. The power source may be a removable, rechargeable battery, such as a lithium-ion battery (e.g., 4×18650 Li-Ion cell) capable of providing power to the environment capture system.

The power converter 904 may change the voltage level from the power source 902 to a lower or higher voltage level so that it may be utilized by the electronic components of the environment capture system. The environment capture system may utilize 4×18650 Li-Ion cells in 4S1P configuration, or four series connections and one parallel connection configuration.

In some embodiments, the I/O PCBA 906 may include elements that provide IMU, Wi-Fi, GPS, Bluetooth, inertial measurement unit (IMU), motor drivers, and microcontrollers. In some embodiments, the I/O PCBA 906 includes a microcontroller for controlling the horizontal motor and encoding horizontal motor controls as well as controlling the vertical motor and encoding vertical motor controls.

The SOM PCBA 908 may include a central processing unit (CPU) and/or graphics processing unit (GPU), memory, and mobile interface. The SOM PCBA 908 may control the LiDAR 912, the image sensor 920, and the I/O PCBA 906. The SOM PCBA 908 may determine the (x, y, z) coordinates associated with each laser pulse of the LiDAR 912 and store the coordinates in a memory component of the SOM PCBA 908. In some embodiments, the SOM PCBA 908 may store the coordinates in the image processing system of the environment capture system 400. In addition to the coordinates associated with each laser pulse, the SOM PCBA 908 may determine additional attributes associated with each laser pulse, including the intensity of the laser pulse, number of returns, the current return number, classification point, RGC values, GPS time, scan angle, and the scan direction.

In some embodiments, the SOM PCBA 908 include an Nvidia SOM PCBA w/CPU/GPU, DDR, eMMC, Ethernet.

The user interface 910 may include physical buttons or switches with which the user may interact with. The buttons or switches may provide functions such as turn the environment capture system on and off, scan a physical environment, and others. In some embodiments, the user interface 910 may include a display such as the display 720 of FIG. 7.

In some embodiments, the LiDAR 912 captures depth information of the physical environment. The LiDAR 912 includes an optical sensing module that can measure the distance to a target or objects in a scene by irradiating the target or scene with light, using pulses from a laser. The optical sensing module of the LiDAR 912 measures the time it takes photons to travel to said target or object and return after reflection to a receiver in the LiDAR 912, thereby giving a distance of the LiDAR from the target or object. Along with the distance, the SOM PCBA 908 may determine the (x, y, z) coordinates associated with each laser pulse. The LiDAR 912 may fit within a width of 58 mm, a height of 55 mm, and a depth of 60 mm.

The LiDAR 912 may include a range (10% reflectance) of 90 m, range (20% reflectance) 130 m, range (100% reflectance) 260 m, a range precision ($1\sigma$@900 m) of 2 cm, a wavelength 1705 nm, and beam divergence of 0.28×0.03 degrees.

The SOM PCBA 908 may determine the coordinates based on the location of the drive train 916. In various embodiments, the LiDAR 912 may include one or more LiDAR devices. Multiple LiDAR devices may be utilized to increase the LiDAR resolution.

The mirror brushless direct current (BLCD) motor 914 may control the mirror assembly 712 of FIG. 7.

In some embodiments, the drive train 916 may include the horizontal motor 726 of FIG. 7. The drive train 916 may provide rotation of the environment capture system when it is mounted on a platform such as a tripod. The drive train 916 may include a stepper motor Nema 14, worm & plastic wheel drive train, clutch, bushing bearing, and a backlash prevention mechanism. In some embodiments, the environment capture system may be able to complete a scan in less than 17 seconds. In various embodiments, the drive train 916 has a maximum speed of 60 degrees/second, a maximum acceleration of 300 degrees/seconds$^2$, a maximum torque of 0.5 nm, an angular position accuracy of less than 0.1 degrees, and an encoder resolution of about 4096 counts per revolution.

In some embodiments, the drive train 916 includes a vertical monogon mirror and motor. In this example, the drive train 916 may include a BLDC motor, an external hall effect sensor, a magnet (paired with Hall effect sensor), a mirror bracket, and a mirror. The drive train 916 in this example may have a maximum speed of 4,000 RPM and a maximum acceleration of 300 degrees/sec^2. In some embodiments, the monogon mirror is a dielectric mirror. In one embodiment, the monogon mirror includes a hydrophobic coating or layer.

The placement of the components of the environment capture system is such that the lens assembly and the LiDAR are substantially placed at a center of an axis of rotation. This may reduce the image parallax that occurs when an image capture system is not placed at the center of the axis of rotation.

In some embodiments, the WFOV lens 918 may be the lens of the lens assembly 704 of FIG. 7. The WFOV lens 918 focuses light onto an image capture device. In some embodiments, the WFOV lens may have a FOV of at least 145 degrees. With such a wide FOV, an image capture of a 360-degree view around the environment capture system may be obtained with three separate image captures of the image capture device. In some embodiments, the WFOV lens 918 may be about ~60 mm diameter and ~80 mm total track length (TTL). In one example, the WFOV lens 918 may include a horizontal field of view that is greater than or equal to 148.3 degrees and a vertical field of view that is greater than or equal to 94 degrees.

An image capture device may include the WFOV lens 918 and the image sensor 920. The image sensor 920 may be a CMOS image sensor. In one embodiment, the image sensor 920 is a charged coupled device (CCD). In some embodiments, the image sensor 920 is a red-green-blue (RGB) sensor. In one embodiment, the image sensor 920 is an IR sensor. In various embodiments, the image capture device may have a resolution of at least 35 pixels per degree (PPD).

In some embodiments, the image capture device may include an F-number of f/2.4, Image circle diameter of 15.86 mm, Pixel pitch of 2.4 um, HFOV>148.3°, VFOV>94.0°, Pixels per degree>38.0 PPD, Chief ray angle at full height of 3.0°, Minimum object distance 1300 mm, Maximum object distance infinity, Relative illumination>130%, Max distortion<90%, and Spectral transmission variation<=5%.

In some embodiments, the lens may include F-number 2.8, Image circle diameter 15.86 mm, Pixels per degree>37, Chief ray angle at sensor full height 3.0, L1 diameter<60 mm, TTL<80 mm, and Relative illumination>50%.

The lens may include 52 1 p/mm (on-axis)>85%, 104 1 p/mm (on-axis)>66%, 1308 1 p/mm (on-axis)>45%, 52 1 p/mm (83% field)>75%, 104 1 p/mm (83% field)>41%, and 1308 1 p/mm (83% field)>25%.

The environment capture system may have a resolution of >20 MP, green sensitivity>1.7 V/lux*s, SNR (100 lux, 1 ×gain)>65 dB, and a dynamic range of >70 dB.

Figure 9B:
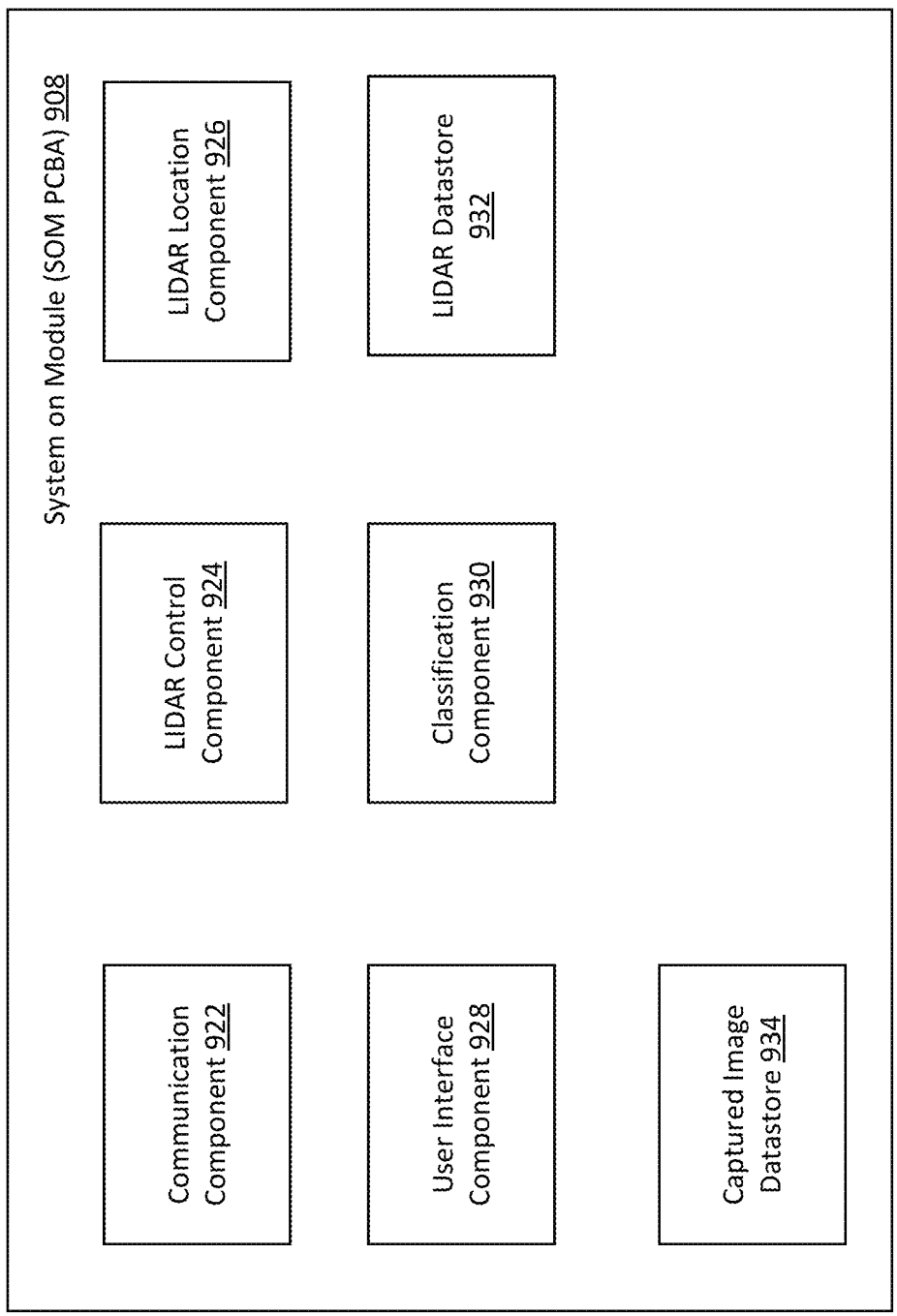
FIG. 9b depicts a block diagram of an example SOM PCBA of the environment capture system according to some embodiments.

FIG. 9*b* depicts a block diagram of an example SOM PCBA 908 of the environment capture system according to some embodiments. The SOM PCBA 908 may include a communication component 922, a LiDAR control component 924, a LiDAR location component 926, a user interface component 928, a classification component 930, a LiDAR datastore 932, and a captured image datastore 934.

In some embodiments, the communication component 922 may send and receive requests or data between any of the components of the SOM PCBA 1008 and components of the environment capture system of FIG. 9*a*.

In various embodiments, the LiDAR control component 924 may control various aspects of the LiDAR. For example, the LiDAR control component 924 may send a control signal to the LiDAR 912 to start sending out a laser pulse. The control signal sent by the LiDAR control component 924 may include instructions on the frequency of the laser pulses.

In some embodiments, the LiDAR location component 926 may utilize GPS data to determine the location of the environment capture system. In various embodiments, the LiDAR location component 926 utilizes the position of the mirror assembly to determine the scan angle and (x, y, z) coordinates associated with each laser pulse. The LiDAR location component 926 may also utilize the IMU to determine the orientation of the environment capture system.

The user interface component 928 may facilitate user interaction with the environment capture system. In some embodiments, the user interface component 928 may provide one or more user interface elements with which a user may interact. The user interface provided by the user interface component 928 may be sent to the user system 1110. For example, the user interface component 928 may provide to the user system (e.g., a digital device) a visual representation of an area of a floorplan of a building. As the user places the environment capture system in different parts of the story of the building to capture and generate 3D panoramic images, the environment capture system may generate the visual representation of the floorplan. The user may place the environment capture system in an area of the physical environment to capture and generate 3D panoramic images in that region of the house. Once the 3D panoramic image of the area has been generated by the image processing system, the user interface component may update the floorplan view with a top-down view of the living room area depicted in FIG. 1B. In some embodiments, the floorplan view 200 may be generated by the user system 1110 after a second sweep of the same home, or floor of a building has been captured.

In various embodiments, the classification component 930 may classify the type of physical environment. The classification component 930 may analyze objects in the images or objects in images to classify the type of physical environment was captured by the environment capture system. In some embodiments, the image processing system may be responsible for classifying the type of physical environment that was captured by the environment capture system 400.

The LiDAR datastore 932 may be any structure and/or structures suitable for captured LiDAR data (e.g., an active database, a relational database, a self-referential database, a table, a matrix, an array, a flat file, a documented-oriented storage system, a non-relational No-SQL system, an FTS-management system such as Lucene/Solar, and/or the like). The image datastore 408 may store the captured LiDAR data. However, the LiDAR datastore 932 may be utilized to cache the captured LiDAR data in cases where the communication network 404 is non-functional. For example, in cases where the environment capture system 402 and the user system 1110 are in a remote location with no cellular network or in a region with no Wi-Fi, the LiDAR datastore 932 may store the captured LiDAR data until they can be transferred to the image datastore 934.

Similar to the LiDAR datastore, the captured image datastore 934 may be any structure and/or structures suitable for captured images (e.g., an active database, a relational database, a self-referential database, a table, a matrix, an array, a flat file, a documented-oriented storage system, a non-relational No-SQL system, an FTS-management system such as Lucene/Solar, and/or the like). The image datastore 934 may store the captured images.

Figure 10A:
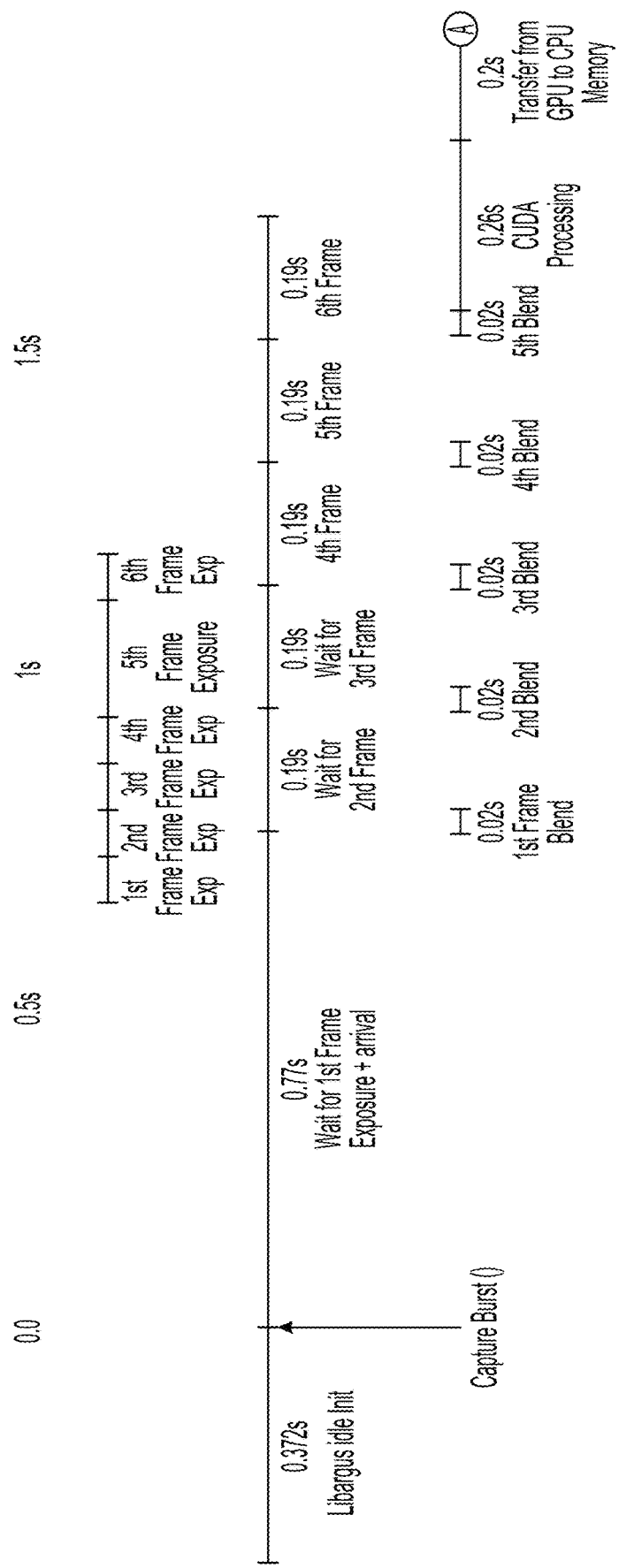
FIG. 10a-10c depicts a process for the environment capture system for taking images in some embodiments.
Figure 10B:
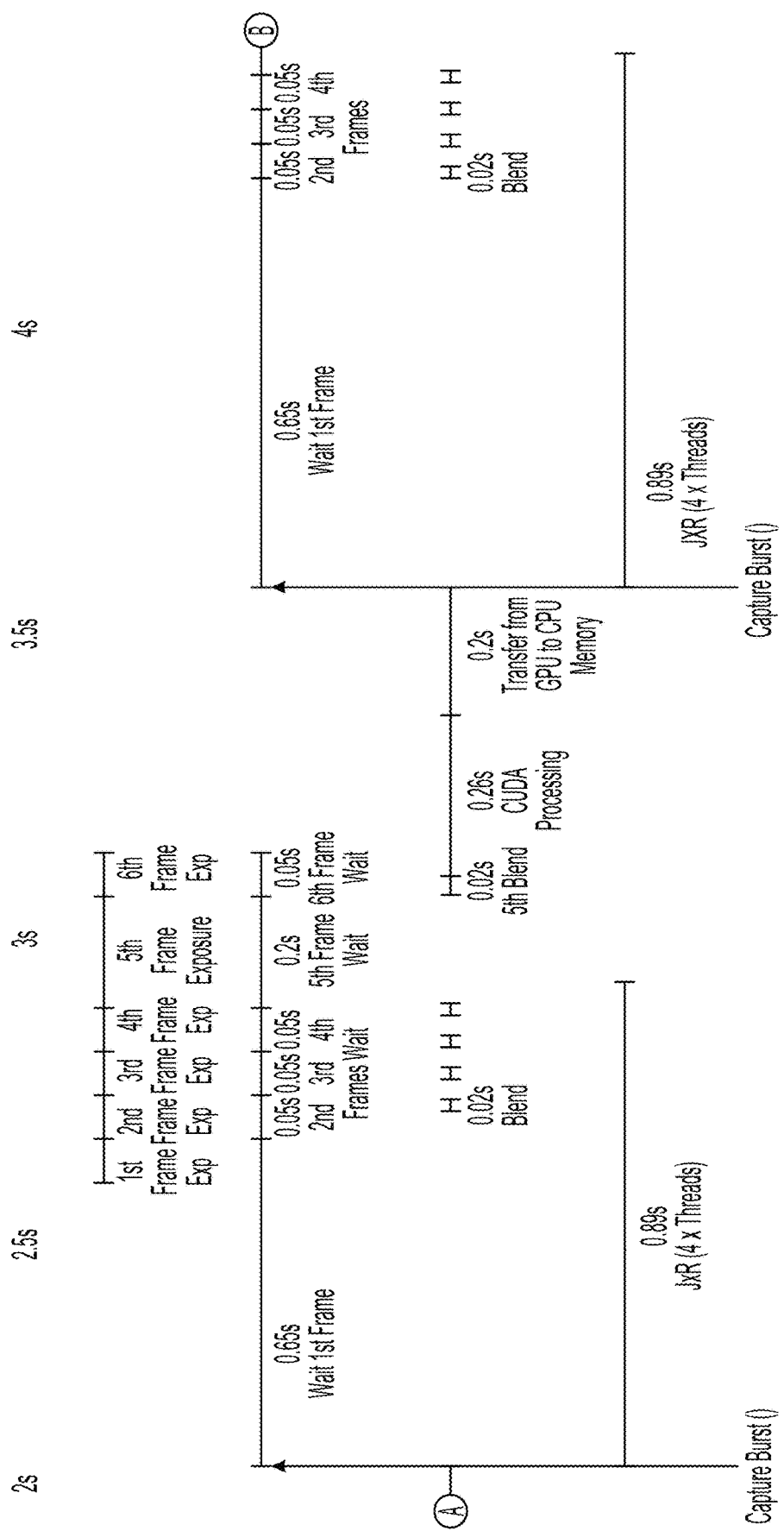
Figure 10C:
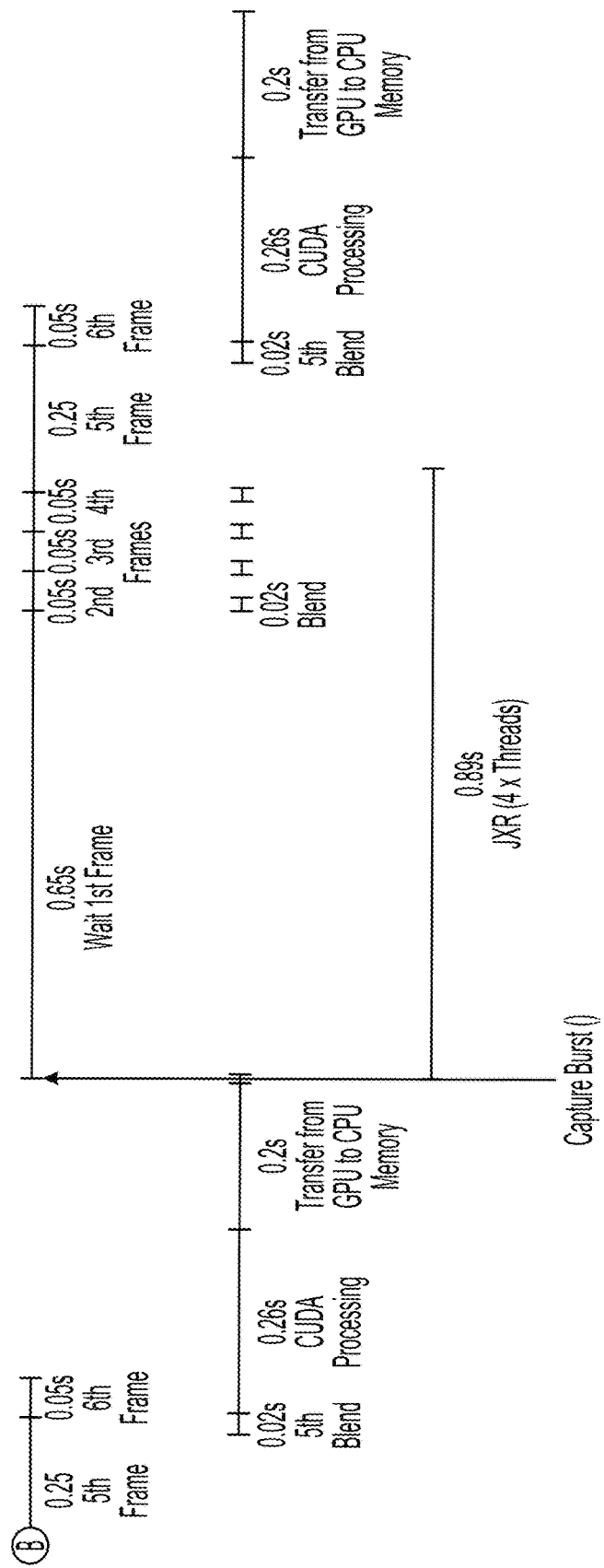

FIG. 10*a*-10*c* depicts a process for the environment capture system 400 for taking images in some embodiments. As depicted in FIG. 10*a*-10*c*, the environment capture system 400 may take a burst of images at different exposures. A burst of images may be a set of images, each with different exposures. The first image burst happens at time 0.0. The environment capture system 400 may receive the first frame and then assess the frame while waiting for the second frame. FIG. 10*a* indicates that the first frame is blended before the second frame arrives. In some embodiments, the environment capture system 400 may process each frame to identify pixels, color, and the like. Once the next frame arrives, the environment capture system 400 may process the recently received frame and then blend the two frames together.

In various embodiments, the environment capture system 400 performs image processing to blend the sixth frame and further assess the pixels in the blended frame (e.g., the frame that may include elements from any number of the frames of the image burst). During the last step prior to or during movement (e.g., turning) of the environment capture system 400, the environment capture system 400 may optionally transfer the blended image from the graphic processing unit to CPU memory.

The process continues in FIG. 10*b*. At the beginning of FIG. 10*b*, the environment capture system 400 conducts another burst. The environment capture system 400 may compress the blended frames and/or all or parts of the captured frames using J×R). Like FIG. 10a, a burst of images may be a set of images, each with different exposures (the length of exposure for each frame the set may the same and in the same order as other bursts covered in FIGS. 10a and 10c). The second image burst happens at time 2 second. The environment capture system 400 may receive the first frame and then assess the frame while waiting for the second frame. FIG. 10b indicates that the first frame is blended before the second frame arrives. In some embodiments, the environment capture system 400 may process each frame to identify pixels, color, and the like. Once the next frame arrives, the environment capture system 400 may process the recently received frame and then blend the two frames together.

In various embodiments, the environment capture system 400 performs image processing to blend the sixth frame and further assess the pixels in the blended frame (e.g., the frame that may include elements from any number of the frames of the image burst). During the last step prior to or during movement (e.g., turning) of the environment capture system 400, the environment capture system 400 may optionally transfer the blended image from the graphic processing unit to CPU memory.

After turning, the environment capture system 400 may continue the process by conducting another color burst (e.g., after turning 180 degrees) at about time 3.5 seconds. The environment capture system 400 may compress the blended frames and/or all or parts of the captured frames using J×R). The burst of images may be a set of images, each with different exposures (the length of exposure for each frame the set may the same and in the same order as other bursts covered in FIGS. 10a and 10c). The environment capture system 400 may receive the first frame and then assess the frame while waiting for the second frame. FIG. 10b indicates that the first frame is blended before the second frame arrives. In some embodiments, the environment capture system 400 may process each frame to identify pixels, color, and the like. Once the next frame arrives, the environment capture system 400 may process the recently received frame and then blend the two frames together.

In various embodiments, the environment capture system 400 performs image processing to blend the sixth frame and further assess the pixels in the blended frame (e.g., the frame that may include elements from any number of the frames of the image burst). During the last step prior to or during movement (e.g., turning) of the environment capture system 400, the environment capture system 400 may optionally transfer the blended image from the graphic processing unit to CPU memory.

The last burst happens at time 5 seconds in FIG. 10c. The environment capture system 400 may compress the blended frames and/or all or parts of the captured frames using J×R). The burst of images may be a set of images, each with different exposures (the length of exposure for each frame the set may the same and in the same order as other bursts covered in FIGS. 10a and 10b). The environment capture system 400 may receive the first frame and then assess the frame while waiting for the second frame. FIG. 10c indicates that the first frame is blended before the second frame arrives. In some embodiments, the environment capture system 400 may process each frame to identify pixels, color, and the like. Once the next frame arrives, the environment capture system 400 may process the recently received frame and then blend the two frames together.

In various embodiments, the environment capture system 400 performs image processing to blend the sixth frame and further assess the pixels in the blended frame (e.g., the frame that may include elements from any number of the frames of the image burst). During the last step prior to or during movement (e.g., turning) of the environment capture system 400, the environment capture system 400 may optionally transfer the blended image from the graphic processing unit to CPU memory.

The dynamic range of an image capture device is a measure of how much light an image sensor can capture. The dynamic range is the difference between the darkest area to the brightest area of an image. There are many ways to increase the dynamic range of the image capture device, one of which is to capture multiple images of the same physical environment using different exposures. An image captured with a short exposure will capture brighter areas of the physical environment, while a long exposure will capture darker physical environment areas. In some embodiments, the environment capture system may capture multiple images with six different exposure times. Some or all of the images captured by the environment capture system are used to generate 2D images with high dynamic range (HDR). One or more of the captured images may be used for other functions such as ambient light detection, flicker detection, and the like.

A 3D panoramic image of the physical environment may be generated based on four separate image captures of the image capture device and four separate depth data capture of the LiDAR device of the environment capture system. Each of the four separate image captures may include a series of image captures of different exposure times. A blending algorithm may be used to blend the series of image captures with the different exposure times to generate one of four RGB image captures, which may be utilized to generate a 2D panoramic image. For example, the environment capture system may be used to capture a 3D panoramic image of a kitchen. Images of one wall of the kitchen may include a window, an image with an image captured with a shorter exposure may provide the view out the window but may leave the rest of the kitchen underexposed. In contrast, another image captured with a longer exposure may provide the view of the interior of the kitchen. The blending algorithm may generate a blended RGB image by blending the view out the window of the kitchen from one image with the rest of the kitchen's view from another image.

In various embodiments, the 3D panoramic image may be generated based on three separate image captures of the image capture device and four separate depth data captures of the LiDAR device of the environment capture system. In some embodiments, the number of image captures, and the number of depth data captures may be the same. In one embodiment, the number of image captures, and the number of depth data captures may be different.

After capturing a first of a series of images with one exposure time, a blending algorithm receives the first of the series of images, calculate initial intensity weights for that image, and set that image as a baseline image for combining the subsequently received images. In some embodiments, the blending algorithm may utilize a graphic processing unit (GPU) image processing routine such as a "blend_kernel" routine. The blending algorithm may receive subsequent images that may be blended with previously received images. In some embodiments, the blending algorithm may utilize a variation of the blend_kernel GPU image processing routine.

In one embodiment, the blending algorithm utilizes other methods of blending multiple images, such as determining the difference between the darkest and brightest part, or contrast, of the baseline image to determine if the baseline image may be overexposed or under-exposed. For example, a contrast value less than a predetermine contrast threshold means that the baseline image is overexposed or under-exposed. In one embodiment, the contrast of the baseline image may be calculated by taking an average of the image's light intensity or a subset of the image. In some embodiments, the blending algorithm calculates an average light intensity for each row or column of the image. In some embodiments, the blending algorithm may determine a histogram of each of the images received from the image capture device and analyze the histogram to determine light intensities of the pixels which make up each of the images.

In various embodiments, the blending may involve sampling colors within two or more images of the same scene, including along objects and seems. If there is a significant difference in color between the two images (e.g., within a predetermined threshold of color, hue, brightness, saturation, and/or the like), a blending module (e.g., on the environment capture system 400 or the user device 1110) may blend a predetermined size of both images along the position where there is the difference. In some embodiments, the greater the difference in color or image at a position in the image, the greater the amount of space around or near the position may be blended.

In some embodiments, after blending, the blending module (e.g., on the environment capture system 400 or the user device 1110) may re-scan and sample colors along the image(s) to determine if there are other differences in image or color that exceed the predetermined threshold of color, hue, brightness, saturation, and/or the like. If so, the blending module may identify the portions within the image(s) and continue to blend that portion of the image. The blending module may continue to resample the images along the seam until there are no further portions of the images to blend (e.g., any differences in color are below the predetermined threshold(s).)

Figure 11:
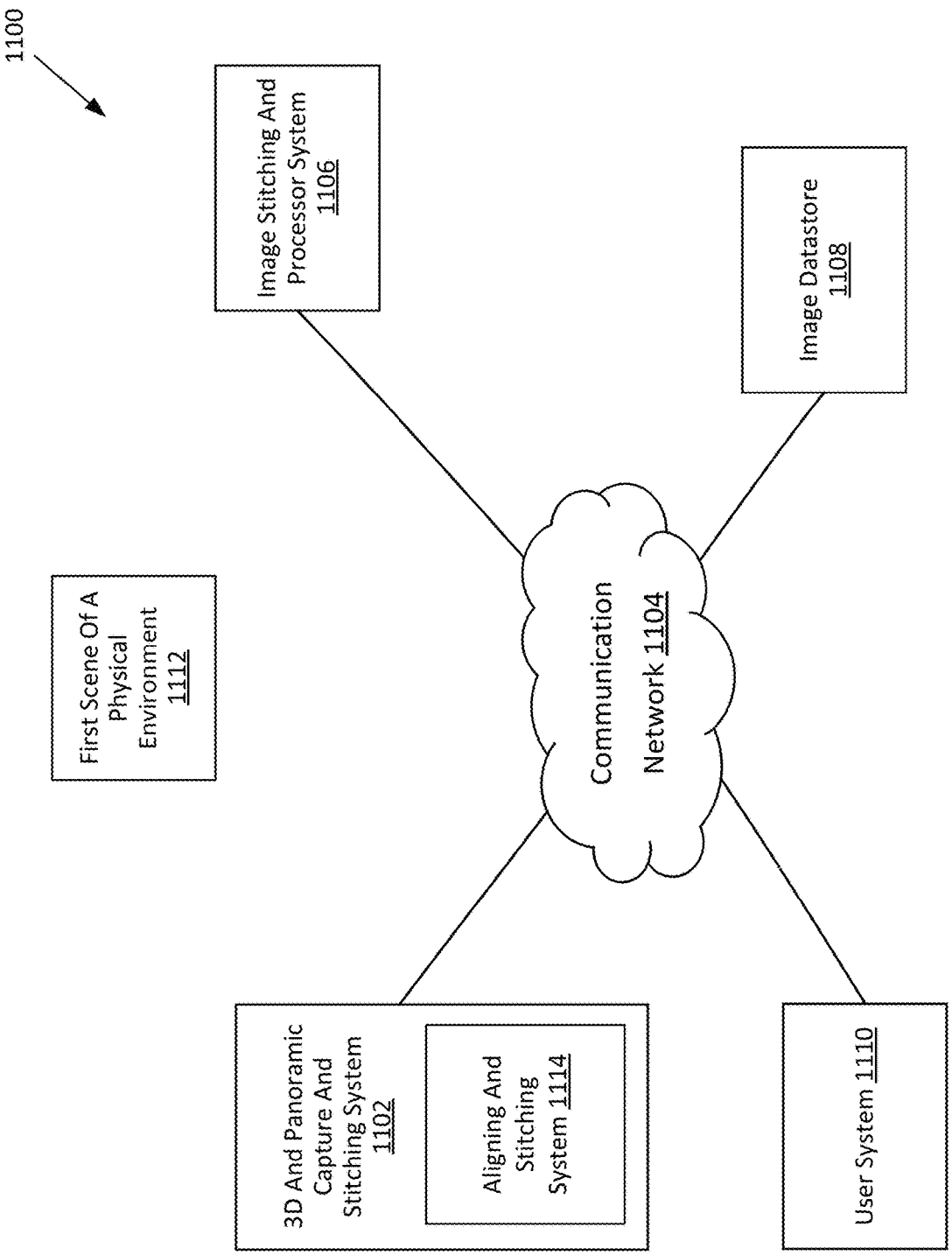
FIG. 11 depicts a block diagram of an example environment capable of capturing and stitching images to form 3D visualizations according to some embodiments.

FIG. 11 depicts a block diagram of an example environment 1100 capable of capturing and stitching images to form 3D visualizations according to some embodiments. The example environment 1100 includes 3D and panoramic capture and stitching system 1102, a communication network 1104, an image stitching and processor system 1106, an image datastore 1108, a user system 1110, and a first scene of a physical environment 1112. The 3D and panoramic capture and stitching system 1102 and/or the user system 1110 may include an image capture device (e.g., environment capture system 400) that may be used to capture images of an environment (e.g., the physical environment 1112).

The 3D and panoramic capture and stitching system 1102 and the image stitching and processor system 1106 may be a part of the same system (e.g., part of one or more digital devices) that are communicatively coupled to the environment capture system 400. In some embodiments, one or more of the functionality of the components of the 3D and panoramic capture and stitching system 1102 and the image stitching and processor system 1106 may be performed by the environment capture system 400. Similarly or alternatively, 3D and panoramic capture and stitching system 1102 and the image stitching and processor system 1106 may be performed by the user system 1110 and/or the image stitching and processor system 1106

The 3D panoramic capture and stitching system 1102 may be utilized by a user to capture multiple 2D images of an environment, such as the inside of a building and/or and outside of the building. For example, the user may utilize the 3D and panoramic capture and stitching system 1102 to capture multiple 2D images of the first scene of the physical environment 1112 provided by the environment capture system 400. The 3D and panoramic capture and stitching system 1102 may include an aligning and stitching system 1114. Alternately, the user system 1110 may include the aligning and stitching system 1114.

The aligning and stitching system 1114 may be software, hardware, or a combination of both configured to provide guidance to the user of an image capture system (e.g., on the 3D and panoramic capture and stitching system 1102 or the user system 1110) and/or process images to enable improved panoramic pictures to be made (e.g., through stitching, aligning, cropping, and/or the like). The aligning and stitching system 1114 may be on a computer-readable media (described herein). In some embodiments, the aligning and stitching system 1114 may include a processor for performing functions.

An example of the first scene of the physical environment 1112 may be any room, real estate, or the like (e.g., a representation of a living room). In some embodiments, the 3D and panoramic capture and stitching system 1102 is utilized to generate 3D panoramic images of indoor environments. The 3D panoramic capture and stitching system 1102 may, in some embodiments, be the environment capture system 400 discussed with regard to FIG. 4.

In some embodiments, the 3D panoramic capture and stitching system 1102 may in communication with a device for capturing images and depth data as well as software (e.g., the environment capture system 400). All or part of the software may be installed on the 3D panoramic capture and stitching system 1102, the user system 1110, the environment capture system 400, or both. In some embodiments, the user may interact with the 3D and panoramic capture and stitching system 1102 via the user system 1110.

The 3D and panoramic capture and stitching system 1102 or the user system 1110 may obtain multiple 2D images. The 3D and panoramic capture and stitching system 1102 or the user system 1110 may obtain depth data (e.g., from a LiDAR device or the like).

In various embodiments, an application on the user system 1110 (e.g., a smart device of the user such as a smartphone or tablet computer) or an application on the environment capture system 400 may provide visual or auditory guidance to the user for taking images with the environment capture system 400. Graphical guidance may include, for example, a floating arrow on a display of the environment capture system 400 (e.g., on a viewfinder or LED screen on the back of the environment capture system 400) to guide the user on where to position and/or point an image capture device. In another example, the application may provide audio guidance on where to position and/or point the image capture device.

In some embodiments, the guidance may allow the user to capture multiple images of the physical environment without the help of a stabilizing platform such as a tripod. In one example, the image capture device may be a personal device such as a smartphone, tablet, media tablet, laptop, and the like. The application may provide direction on position for each sweep, to approximate the no-parallax point based on position of the image capture device, location information from the image capture device, and/or previous image of the image capture device.

In some embodiments, the visual and/or auditory guidance enables the capture of images that can be stitched together to form panoramas without a tripod and without camera positioning information (e.g., indicating a location, position, and/or orientation of the camera from a sensor, GPS device, or the like).

The aligning and stitching system 1114 may align or stitch 2D images (e.g., captured by the user system 1110 or the 3D panoramic capture and stitching system 1102) to obtain a 2D panoramic image.

In some embodiments, the aligning and stitching system 1114 utilizes a machine learning algorithm to align or stitch multiple 2D images into a 2D panoramic image. The parameters of the machine learning algorithm may be managed by the aligning and stitching system 1114. For example, the 3D and panoramic capture and stitching system 1102 and/or the aligning and stitching system 1114 may recognize objects within the 2D images to aid in aligning the images into a 2D panoramic image.

In some embodiments, the aligning and stitching system 1114 may utilize depth data and the 2D panoramic image to obtain a 3D panoramic image. The 3D panoramic image may be provided to the 3D and panoramic stitching system 1102 or the user system 1110. In some embodiments, the aligning and stitching system 1114 determines 3D/depth measurements associated with recognized objects within a 3D panoramic image and/or sends one or more 2D images, depth data, 2D panoramic image(s), 3D panoramic image(s) to the image stitching and processor system 106 to obtain a 2D panoramic image or a 3D panoramic image with pixel resolution that is greater than the 2D panoramic image or the 3D panoramic image provided by the 3D and panoramic capture and stitching system 1102.

The communication network 1104 may represent one or more computer networks (e.g., LAN, WAN, or the like) or other transmission mediums. The communication network 1104 may provide communication between systems 1102, 1106-1110, and/or other systems described herein. In some embodiments, the communication network 104 includes one or more digital devices, routers, cables, buses, and/or other network topologies (e.g., mesh, and the like). In some embodiments, the communication network 1104 may be wired and/or wireless. In various embodiments, the communication network 1104 may include the Internet, one or more wide area networks (WANs) or local area networks (LANs), one or more networks that may be public, private, IP-based, non-IP based, and so forth.

The image stitching and processor system 1106 may process 2D images captured by the image capture device (e.g., the environment capture system 400 or a user device such as a smartphone, personal computer, media tablet, or the like) and stitch them into a 2D panoramic image. The 2D panoramic image processed by the image stitching and processor system 106 may have a higher pixel resolution than the panoramic image obtained by the 3D and panoramic capture and stitching system 1102.

In some embodiments, the image stitching and processor system 1106 receives and processes the 3D panoramic image to create a 3D panoramic image with pixel resolution that is higher than that of the received 3D panoramic image. The higher pixel resolution panoramic images may be provided to an output device with a higher screen resolution than the user system 1110, such as a computer screen, projector screen, and the like. In some embodiments, the higher pixel resolution panoramic images may provide to the output device a panoramic image in greater detail and may be magnified.

The image datastore 1108 may be any structure and/or structures suitable for captured images and/or depth data (e.g., an active database, a relational database, a self-referential database, a table, a matrix, an array, a flat file, a documented-oriented storage system, a non-relational NoSQL system, an FTS-management system such as Lucene/Solar, and/or the like). The image datastore 1108 may store images captured by the image capture device of the user system 1110. In various embodiments, the image datastore 1108 stores depth data captured by one or more depth sensors of the user system 1110. In various embodiments, the image datastore 1108 stores properties associated with the image capture device or properties associated with each of the multiple image captures or depth captures used to determine the 2D or 3D panoramic image. In some embodiments, the image datastore 1108 stores panoramic 2D or 3D panoramic images. The 2D or 3D panoramic images may be determined by the 3D and panoramic capture and stitching system 1102 or the image stitching and processor system 106.

The user system 1110 may communicate between users and other associated systems. In some embodiments, the user system 1110 may be or include one or more mobile devices (e.g., smartphones, cell phones, smartwatches, or the like).

The user system 1110 may include one or more image capture devices. The one or more image capture devices can include, for example, RGB cameras, HDR cameras, video cameras, IR cameras, and the like.

The 3D and panoramic capture and stitching system 1102 and/or the user system 1110 may include two or more capture devices may be arranged in relative positions to one another on or within the same mobile housing such that their collective fields of view span up to 360°. In some embodiments, pairs of image capture devices can be used capable of generating stereo-image pairs (e.g., with slightly offset yet partially overlapping fields of view). The user system 1110 may include two image capture devices with vertical stereo offset fields-of-view capable of capturing vertical stereo image pairs. In another example, the user system 1110 can comprise two image capture devices with vertical stereo offset fields-of-view capable of capturing vertical stereo image pairs.

In some embodiments, the user system 1110, environment capture system 400, or the 3D and panoramic capture and stitching system 1102 may generate and/or provide image capture position and location information. For example, the user system 1110 or the 3D and panoramic capture and stitching system 1102 may include an inertial measurement unit (IMU) to assist in determining position data in association with one or more image capture devices that capture the multiple 2D images. The user system 1110 may include a global positioning sensor (GPS) to provide GPS coordinate information in association with the multiple 2D images captured by one or more image capture devices.

In some embodiments, users may interact with the aligning and stitching system 1114 using a mobile application installed in the user system 1110. The 3D and panoramic capture and stitching system 1102 may provide images to the user system 1110. A user may utilize the aligning and stitching system 1114 on the user system 1110 to view images and previews.

In various embodiments, the aligning and stitching system 1114 may be configured to provide or receive one or more 3D panoramic images from the 3D and panoramic capture and stitching system 1102 and/or the image stitching and processor system 1106. In some embodiments, the 3D and panoramic capture and stitching system 1102 may provide a visual representation of a portion of a floorplan of a building, which has been captured by the 3D and panoramic capture and stitching system 1102 to the user system 1110.

The user of the system 1110 may navigate the space around the area and view different rooms of the house. In some embodiments, the user of the user system 1110 may display the 3D panoramic images, such as the example 3D panoramic image, as the image stitching and processor system 1106 completes the generation of the 3D panoramic image. In various embodiments, the user system 1110 generates a preview or thumbnail of the 3D panoramic image. The preview 3D panoramic image may have an image resolution that is lower than a 3D panoramic image generated by the 3D and panoramic capture and stitching system 1102.

Figure 12:
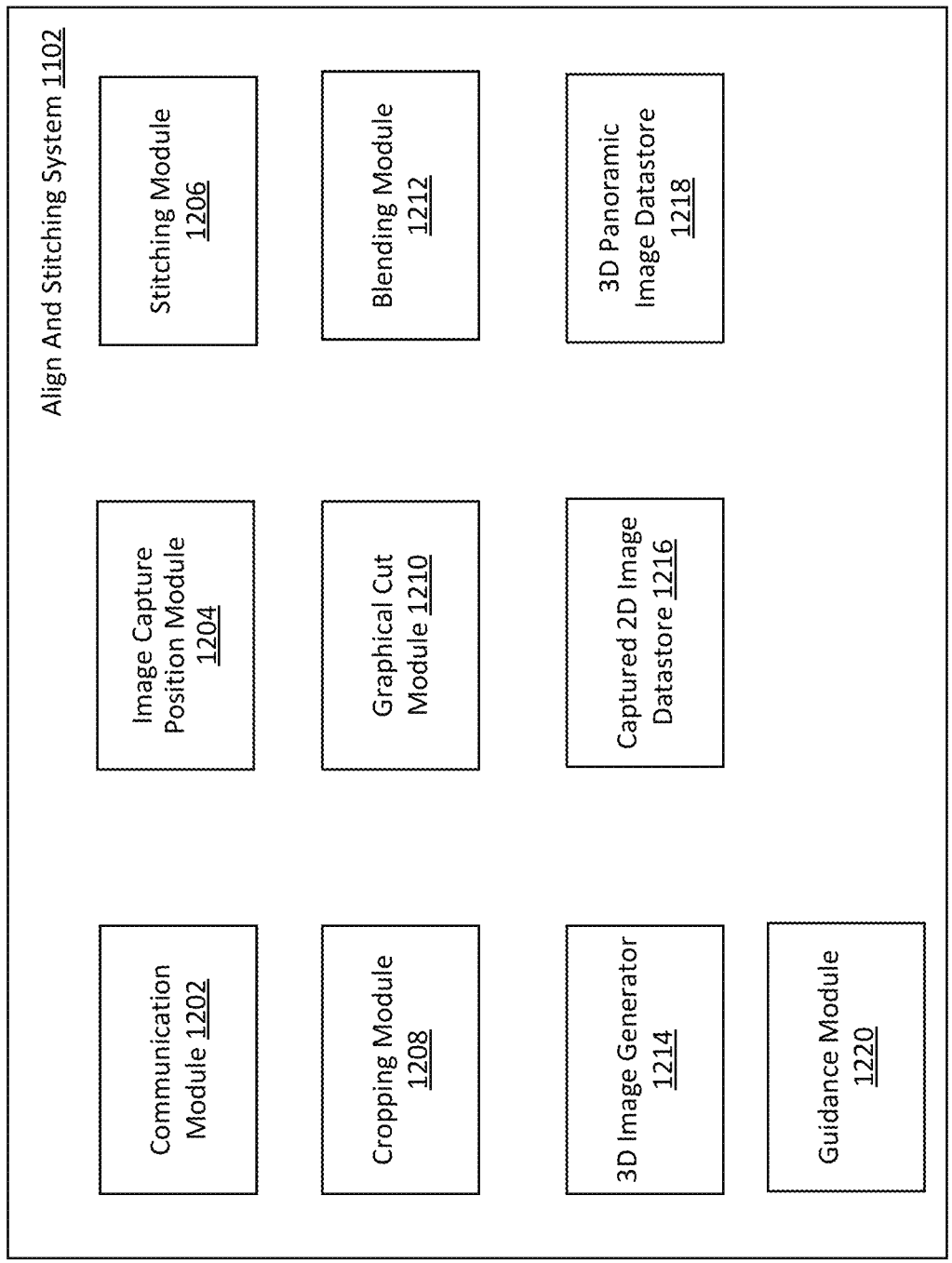
FIG. 12 is a block diagram of an example of the align and stitching system according to some embodiments.

FIG. 12 is a block diagram of an example of the align and stitching system 1114 according to some embodiments. The align and stitching system 1114 includes a communication module 1202, an image capture position module 1204, a stitching module 1206, a cropping module 1208, a graphical cut module 1210, a blending module 1211, a 3D image generator 1214, a captured 2D image datastore 1216, a 3D panoramic image datastore 1218, and a guidance module 220. It may be appreciated that there may be any number of modules of the aligning and stitching system 1114 that perform one or more different functions as described herein.

In some embodiments, the aligning and stitching system 1114 includes an image capture module configured to receive images from one or more image capture devices (e.g., cameras). The aligning and stitching system 1114 may also include a depth module configured to receive depth data from a depth device such as a LiDAR if available.

The communication module 1202 may send and receive requests, images, or data between any of the modules or datastores of the aligning and stitching system 1114 and components of the example environment 1100 of FIG. 11. Similarly, the aligning and stitching system 1114 may send and receive requests, images, or data across the communication network 1104 to any device or system.

In some embodiments, the image capture position module 1204 may determine image capture device position data of an image capture device (e.g., a camera which may be a stand-alone camera, smartphone, media tablet, laptop, or the like). Image capture device position data may indicate a position and orientation of an image capture device and/or lens. In one example, the image capture position module 1204 may utilize the IMU of the user system 1110, camera, digital device with a camera, or the 3D and panoramic capture and stitching system 1102 to generate position data of the image capture device. The image capture position module 1204 may determine the current direction, angle, or tilt of one or more image capture devices (or lenses). The image capture position module 1204 may also utilize the GPS of the user system 1110 or the 3D and panoramic capture and stitching system 1102.

For example, when a user wants to use the user system 1110 to capture a 360° view of the physical environment, such as a living room, the user may hold the user system 1110 in front of them at eye level to start to capture one of a multiple of images which will eventually become a 3D panoramic image. To reduce the amount of parallax to the image and capture images better suited for stitching and generating 3D panoramic images, it may be preferable if one or more image capture devices rotate at the center of the axis of rotation. The aligning and stitching system 1114 may receive position information (e.g., from the IMU) to determine the position of the image capture device or lens. The aligning and stitching system 1114 may receive and store a field of view of the lens. The guidance module 1220 may provide visual and/or audio information regarding a recommended initial position of the image capture device. The guidance module 1220 may make recommendations for positioning the image capture device for subsequent images. In one example, the guidance module 1220 may provide guidance to the user to rotate and position the image capture device such that the image capture device rotates close to a center of rotation. Further, the guidance module 1220 may provide guidance to the user to rotate and position the image capture device such that subsequent images are substantially aligned based on characteristics of the field of view and/or image capture device.

The guidance module 1220 may provide the user with visual guidance. For example, the guidance module 1220 may place markers or an arrow in a viewer or display on the user system 1110 or the 3D and panoramic capture and stitching system 1102. In some embodiments, the user system 1110 may be a smartphone or tablet computer with a display. When taking one or more pictures, the guidance module 1220 may position one or more markers (e.g., different color markers or the same markers) on an output device and/or in a viewfinder. The user may then use the markers on the output device and/or viewfinder to align the next image.

There are numerous techniques for guiding the user of the user system 1110 or the 3D and panoramic capture and stitching system 1102 to take multiple images for ease of stitching the images into a panorama. When taking a panorama from multiple images, images may be stitched together. To improve time, efficiency, and effectiveness of stitching the images together with reduced need of correcting artifacts or misalignments, the image capture position module 1204 and the guidance module 1220 may assist the user in taking multiple images in positions that improve the quality, time efficiency, and effectiveness of image stitching for the desired panorama.

For example, after taking the first picture, the display of the user system 1110 may include two or more objects, such as circles. Two circles may appear to be stationary relative to the environment and two circles may move with the user system 1110. When the two stationary circles are aligned with the two circles that move with the user system 1110, the image capture device and/or the user system 1110 may be aligned for the next image.

In some embodiments, after an image is taken by an image capture device, the image capture position module 1204 may take a sensor measurement of the position of the image capture device (e.g., including orientation, tilt, and the like). The image capture position module 1204 may determine one or more edges of the image that was taken by calculating the location of the edge of a field of view based on the sensor measurement. Additionally, or alternatively, the image capture position module 1204 may determine one or more edges of the image by scanning the image taken by the image capture device, identifying objects within that image (e.g., using machine learning models discussed herein), determining one or more edges of the image, and positioning objects (e.g., circles or other shapes) at the edge of a display on the user system 1110.

The image capture position module 1204 may display two objects within a display of the user system 1110 that indicates the positioning of the field of view for the next picture. These two objects may indicate positions in the environment that represent where there is an edge of the last image. The image capture position module 1204 may continue to receive sensor measurements of the position of the image capture device and calculate two additional objects in the field of view. The two additional objects may be the same width apart as the previous two objects. While the first two objects may represent an edge of the taken image (e.g., the far right edge of the image), the next two additional objects representing an edge of the field of view may be on the opposite edge (e.g., the far left edge of the field of view). By having the user physically aligning the first two objects on the edge of the image with the additional two objects on the opposite edge of the field of view, the image capture device may be positioned to take another image that can be more effectively stitched together without a tripod. This process can continue for each image until the user determines the desired panorama has been captured.

Although multiple objects are discussed herein, it will be appreciated that the image capture position module 1204 may calculate the position of one or more objects for positioning the image capture device. The objects may be any shape (e.g., circular, oblong, square, emoji, arrows, or the like). In some embodiments, the objects may be of different shapes.

In some embodiments, there may be a distance between the objects that represent the edge of a captured image and the distance between the objects of a field of view. The user may be guided to move forward to move away to enable there to be sufficient distance between the objects. Alternately, the size of the objects in the field of view may change to match a size of the objects that represent an edge of a captured image as the image capture device approaches the correct position (e.g., by coming closer or farther away from a position that will enable the next image to be taken in a position that will improve stitching of images.

In some embodiments, the image capture position module 1204 may utilize objects in an image captured by the image capture device to estimate the position of the image capture device. For example, the image capture position module 1204 may utilize GPS coordinates to determine the geographical location associated with the image. The image capture position module 1204 may use the position to identify landmarks that may be captured by the image capture device.

The image capture position module 1204 may include a 2D machine learning model to convert 2D images into 2D panoramic images. The image capture position module 1204 may include a 3D machine learning model to convert 2D images to 3D representations. In one example, a 3D representation may be utilized to display a three-dimensional walkthrough or visualization of an interior and/or exterior environment.

The 2D machine learning model may be trained to stitch or assist in stitching two or more 2D images together to form a 2D panorama image. The 2D machine learning model may, for example, be a neural network trained with 2D images that include physical objects in the images as well as object identifying information to train the 2D machine learning model to identify objects in subsequent 2D images. The objects in the 2D images may assist in determining position (s) within a 2D image to assist in determining edges of the 2D image, warping in the 2D image, and assist in alignment of the image. Further, the objects in the 2D images may assist in determining artifacts in the 2D image, blending of an artifact or border between two images, positions to cut images, and/or crop the images.

In some embodiments, the 2D machine learning model may, for example, be a neural network trained with 2D images that include depth information (e.g., from a LiDAR device or structured light device of the user system 1110 or the 3D and panoramic capture and stitching system 1102) of the environment as well as include physical objects in the images to identify the physical objects, position of the physical objects, and/or position of the image capture device/field of view. The 2D machine learning model may identify physical objects as well as their depth relative to other aspects of the 2D images to assist in the alignment and position of two 2D images for stitching (or to stitch the two 2D images).

The 2D machine learning model may include any number of machine learning models (e.g., any number of models generated by neural networks or the like).

The 2D machine learning model may be stored on the 3D and panoramic capture and stitching system 1102, the image stitching and processor system 1106, and/or the user system 1110. In some embodiments, the 2D machine learning model may be trained by the image stitching and processor system 1106.

The image capture position module 1204 may estimate the position of the image capture device (a position of the field of view of the image capture device) based on a seam between two or more 2D images from the stitching module 1206, the image warping from the cropping module 1208, and/or the graphical cut from the graphical cut module 1210.

The stitching module 1206 may combine two or more 2D images to generate a 2D panoramic. Based on the seam between two or more 2D images from the stitching module 1206, the image warping from the cropping module 1208, and/or a graphical cut, which has a field of view that is greater than the field of views of each of the two or more images.

The stitching module 1206 may be configured to align or "stitch together" two different 2D images providing different perspectives of the same environment to generate a panoramic 2D image of the environment. For example, the stitching module 1206 can employ known or derived (e.g., using techniques described herein) information regarding the capture positions and orientations of respective 2D images to assist in stitching two images together.

The stitching module 1206 may receive two 2D images. The first 2D image may have been taken immediately before the second image or within a predetermined period of time. In various embodiments, the stitching module 1206 may receive positioning information of the image capture device associated with the first image and then positioning information associated with the second image. The positioning information may be associated with an image based on, at the time the image was taken, positioning data from the IMU, GPS, and/or information provided by the user.

In some embodiments, the stitching module 1206 may utilize a 2D machine learning module for scanning both images to recognize objects within both images, including objects (or parts of objects) that may be shared by both images. For example, the stitching module 1206 may identify a corner, pattern on a wall, furniture, or the like shared at opposite edges of both images.

The stitching module 1206 may align edges of the two 2D images based on the positioning of the shared objects (or parts of objects), positioning data from the IMU, positioning data from the GPS, and/or information provided by the user and then combine the two edges of the images (i.e., "stitch" them together). In some embodiments, the stitching module 1206 may identify a portion of the two 2D images that overlap each other and stitch the images at the position that is overlapped (e.g., using the positioning data and/or the results of the 2D machine learning model.

In various embodiments, the 2D machine learning model may be trained to use the positioning data from the IMU, positioning data from the GPS, and/or information provided by the user to combine or stitch the two edges of the images. In some embodiments, the 2D machine learning model may be trained to identify common objects in both 2D images to align and position the 2D images and then combine or stitch the two edges of the images. In further embodiments, the 2D machine learning model may be trained to use the positioning data and object recognition to align and position the 2D images and then stitch the two edges of the images together to form all or part of the panoramic 2D image.

The stitching module 1206 may utilize depth information for the respective images (e.g., pixels in the respective images, objects in the respective images, or the like) to facilitate aligning the respective 2D images to one another in association with generating a single 2D panoramic image of the environment.

The cropping module 1208 may resolve issues with two or more 2D images where the image capture device was not held in the same position when 2D images were captured. For example, while capturing an image, the user may position the user system 1110 in a vertical position. However, while capturing another image, the user may position the user system at an angle. The resultant images may not be aligned and may suffer from parallax effects. Parallax effects may occur when foreground and background objects do not line up in the same way in the first image and the second image.

The cropping module 1208 may utilize the 2D machine learning model (by applying positioning information, depth information, and/or object recognition) to detect changes in the position of the image capture device in two or more images and then measure the amount of change in position of the image capture device. The cropping module 1208 may warp one or multiple 2D images so that the images may be able to line up together to form a panoramic image when the images are stitched, and while at the same time preserving certain characteristics of the images such as keeping a straight line straight.

The output of the cropping module 1208 may include the number of pixel columns and rows to offset each pixel of the image to straighten out the image. The amount of offset for each image may be outputted in the form of a matrix representing the number of pixel columns and pixel rows to offset each pixel of the image.

In some embodiments, the cropping module 1208 may determine the amount of image warping to perform on one or more of the multiple 2D images captured by the image capture devices of the user system 1110 based on one or more image capture position from the image capture position module 1204 or seam between two or more 2D images from the stitching module 1206, the graphical cut from the graphical cut module 1210, or blending of colors from the blending module 1211.

The graphical cut module 1210 may determine where to cut or slice one or more of the 2D images captured by the image capture device. For example, the graphical cut module 1210 may utilize the 2D machine learning model to identify objects in both images and determine that they are the same object. The image capture position module 1204, the cropping module 1208, and/or the graphical cut module 1210 may determine that the two images cannot be aligned, even if warped. The graphical cut module 1210 may utilize the information from the 2D machine learning model to identify sections of both images that may be stitched together (e.g., by cutting out a part of one or both images to assist in alignment and positioning). In some embodiments, the two 2D images may overlap at least a portion of the physical world represented in the images. The graphical cut module 1210 may identify an object, such as the same chair, in both images. However, the images of the chair may not line up to generate a panoramic that is not distorted and would not correctly represent the portion of the physical world, even after image capture positioning and image wrapping by the cropping module 1208. The graphical cut module 1210 may select one of the two images of the chair to be the correct representation (e.g., based on misalignment, positioning, and/or artifacts of one image when compared to the other) and cut the chair from the image with misaligning, errors in positioning, and/or artifacts. The stitching module 1206 may subsequently stitch the two images together.

The graphical cut module 1210 may try both combinations, for example, cutting the image of the chair from the first image and stitching the first image, minus the chair to the second image, to determine which graphical cut generates a more accurate panoramic image. The output of the graphical cut module 1210 may be a location to cut one or more of the multiple 2D images which correspond to the graphical cut, which generates a more accurate panoramic image.

The graphical cut module 1210 may determine how to cut or slice one or more of the 2D images captured by the image capture device based on one or more image capture position from the image capture position module 1204, stitching, or seam between two or more 2D images from the stitching module 1206, the image warping from the cropping module 1208, and the graphical cut from the graphical cut module 1210.

The blending module 1211 may colors at the seams (e.g., stitching) between two images so that the seams are invisible. Variation in lighting and shadows may cause the same object or surface to be outputted in slightly different colors or shades. The blending module may determine the amount of color blending required based on one or more image capture position from the image capture position module 1204, stitching, image colors along the seams from both images, the image warping from the cropping module 1208, and/or the graphical cut from the graphical cut module 1210.

In various embodiments, the blending module 1211 may receive a panorama from a combination of two 2D images and then sample colors along the seam of the two 2D images. The blending module 1211 may receive seam location information from the image capture position module 1204 to enable the blending module 1211 to sample colors along the seam and determine differences. If there is a significant difference in color along a seam between the two images (e.g., within a predetermined threshold of color, hue, brightness, saturation, and/or the like), the blending module 1211 may blend a predetermined size of both images along the seam at the position where there is the difference. In some embodiments, the greater the difference in color or image along the seam, the greater the amount of space along the seam of the two images that may be blended.

In some embodiments, after blending, the blending module 1211 may re-scan and sample colors along the seam to determine if there are other differences in image or color that exceed the predetermined threshold of color, hue, brightness, saturation, and/or the like. If so, the blending module 1211 may identify the portions along the seam and continue to blend that portion of the image. The blending module 1211 may continue to resample the images along the seam until there are no further portions of the images to blend (e.g., any differences in color are below the predetermined threshold(s).)

The 3D image generator 1214 may receive 2D panoramic images and generate 3D representations. In various embodiments, the 3D image generator 1214 utilizes a 3D machine learning model to transform the 2D panoramic images into 3D representations. The 3D machine learning model may be trained using 2D panoramic images and depth data (e.g., from a LiDAR sensor or structured light device) to create 3D representations. The 3D representations may be tested and reviewed for curation and feedback. In some embodiments, the 3D machine learning model may be used with 2D panoramic images and depth data to generate the 3D representations.

In various embodiments, the accuracy, speed of rendering, and quality of the 3D representation generated by the 3D image generator 1214 are greatly improved by utilizing the systems and methods described herein. For example, by rendering a 3D representation from 2D panoramic images that have been aligned, positioned, and stitched using methods described herein (e.g., by alignment and positioning information provided by hardware, by improved positioning caused by the guidance provided to the user during image capture, by cropping and changing warping of images, by cutting images to avoid artifacts and overcome warping, by blending images, and/or any combination), the accuracy, speed of rendering, and quality of the 3D representation are improved. Further, it will be appreciated that by utilizing 2D panoramic images that have been aligned, positioned, and stitched using methods described herein, training of the 3D machine learning model may be greatly improved (e.g., in terms of speed and accuracy). Further, in some embodiments, the 3D machine learning model may be smaller and less complex because of the reduction of processing and learning that would have been used to overcome misalignments, errors in positioning, warping, poor graphic cutting, poor blending, artifacts, and the like to generate reasonably accurate 3D representations.

The trained 3D machine learning model may be stored in the 3D and panoramic capture and stitching system 1102, image stitching and processor system 106, and/or the user system 1110.

In some embodiments, the 3D machine learning model may be trained using multiple 2D images and depth data from the image capture device of the user system 1110 and/or the 3D and panoramic capture and stitching system 1102. In addition, the 3D image generator 1214 may be trained using image capture position information associated with each of the multiple 2D images from the image capture position module 1204, seam locations to align or stitch each of the multiple 2D images from the stitching module 1206, pixel offset(s) for each of the multiple 2D images from the cropping module 1208, and/or the graphical cut from the graphical cut module 1210. In some embodiments, the 3D machine learning model may be used with 2D panoramic images, depth data, image capture position information associated with each of the multiple 2D images from the image capture position module 1204, seam locations to align or stitch each of the multiple 2D images from the stitching module 1206, pixel offset(s) for each of the multiple 2D images from the cropping module 1208, and/or the graphical cut from the graphical cut module 1210 to generate the 3D representations.

The stitching module 1206 may be a part of a 3D model that converts multiple 2D images into 2D panoramic or 3D panoramic images. In some embodiments, the 3D model is a machine learning algorithm, such as a 3D-from-2D prediction neural network model. The cropping module 1208 may be a part of a 3D model that converts multiple 2D images into 2D panoramic or 3D panoramic images. In some embodiments, the 3D model is a machine learning algorithm, such as a 3D-from-2D prediction neural network model. The graphical cut module 1210 may be a part of a 3D model that converts multiple 2D images into 2D panoramic or 3D panoramic images. In some embodiments, the 3D model is a machine learning algorithm, such as a 3D-from-2D prediction neural network model. The blending module 1211 may be a part of a 3D machine learning model that converts multiple 2D images into 2D panoramic or 3D panoramic images. In some embodiments, the 3D model is a machine learning algorithm, such as a 3D-from-2D prediction neural network model.

The 3D image generator 1214 may generate a weighting for each of the image capture position module 1204, the cropping module 1208, the graphical cut module 1210, and the blending module 1211, which may represent the reliability or a "strength" or "weakness" of the module. In some embodiments, the sum of the weightings of the modules equals 1.

In cases where depth data is not available for the multiple 2D images, the 3D image generator 1214 may determine depth data for one or more objects in the multiple 2D images captured by the image capture device of the user system 1110. In some embodiments, the 3D image generator 1214 may derive the depth data based on images captured by stereo-image pairs. The 3D image generator can evaluate stereo image pairs to determine data about the photometric match quality between the images at various depths (a more intermediate result), rather than determining depth data from a passive stereo algorithm.

The 3D image generator 1214 may be a part of a 3D model that converts multiple 2D images into 2D panoramic or 3D panoramic images. In some embodiments, the 3D model is a machine learning algorithm, such as a 3D-from-2D prediction neural network model.

The captured 2D image datastore 1216 may be any structure and/or structures suitable for captured images and/or depth data (e.g., an active database, a relational database, a self-referential database, a table, a matrix, an array, a flat file, a documented-oriented storage system, a non-relational No-SQL system, an FTS-management system such as Lucene/Solar, and/or the like). The captured 2D image datastore 1216 may store images captured by the image capture device of the user system 1110. In various embodiments, the captured 2D image datastore 1216 stores depth data captured by one or more depth sensors of the user system 1110. In various embodiments, the captured 2D image datastore 1216 stores image capture device parameters associated with the image capture device, or capture properties associated with each of the multiple image captures, or depth captures used to determine the 2D panoramic image. In some embodiments, the image datastore 1108 stores panoramic 2D panoramic images. The 2D panoramic images may be determined by the 3D and panoramic capture and stitching system 1102 or the image stitching and processor system 106. Image capture device parameters may include lighting, color, image capture lens focal length, maximum aperture, angle of tilt, and the like. Capture properties may include pixel resolution, lens distortion, lighting, and other image metadata.

The 3D panoramic image datastore 1218 may be any structure and/or structures suitable for 3D panoramic images (e.g., an active database, a relational database, a self-referential database, a table, a matrix, an array, a flat file, a documented-oriented storage system, a non-relational No-SQL system, an FTS-management system such as Lucene/Solar, and/or the like). The 3D panoramic image datastore 1218 may store 3D panoramic images generated by the 3D and panoramic capture and stitching system 1102. In various embodiments, the 3D panoramic image datastore 1218 stores properties associated with the image capture device or properties associated with each of the multiple image capture or depth capture used to determine the 3D panoramic image. In some embodiments, the 3D panoramic image datastore 1218 stores the 3D panoramic images. The 2D or 3D panoramic images may be determined by the 3D and panoramic capture and stitching system 1102 or the image stitching and processor system 106.

Figure 13:
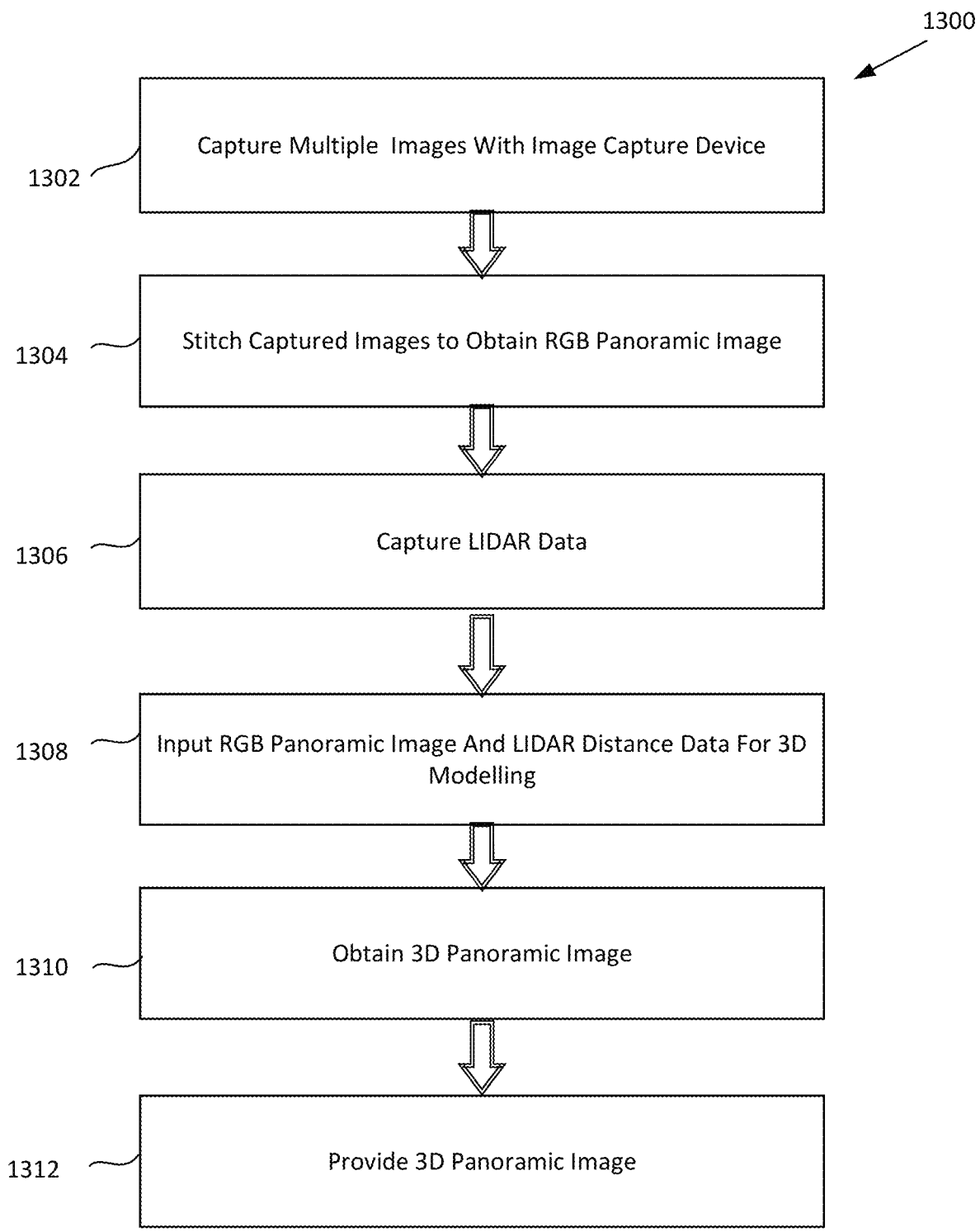
FIG. 13 depicts a flow chart of a 3D panoramic image capture and generation process according to some embodiments.

FIG. 13 depicts a flow chart 1300 of a 3D panoramic image capture and generation process according to some embodiments. In step 1302, the image capture device may capture multiple 2D images using the image sensor 920 and the WFOV lens 918 of FIG. 9. The wider FOV means that the environment capture system 402 will require fewer scans to obtain a 360° view. The WFOV lens 918 may also be wider horizontally as well as vertically. In some embodiments, the image sensor 920 captures RGB images. In one embodiment, the image sensor 920 captures black and white images.

In step 1304, the environment capture system may send the captured 2D images to the image stitching and processor system 1106. The image stitching and processor system 1106 may apply a 3D modeling algorithm to the captured 2D images to generate a panoramic 2D image. In some embodiments, the 3D modeling algorithm is a machine learning algorithm to stitch the captured 2D images into a panoramic 2D image. In some embodiments, step 1304 may be optional.

In step 1306, the LiDAR 912 and WFOV lens 918 of FIG. 9 may capture LiDAR data. The wider FOV means that the environment capture system 400 will require fewer scans to obtain a 360° view.

In step 1308, the LiDAR data may be sent to the image stitching and processor system 1106. The image stitching and processor system 1106 may input the LiDAR data and the captured 2D image into the 3D modeling algorithm to generate the 3D panoramic image. The 3D modeling algorithm is a machine learning algorithm.

In step 1310, the image stitching and processor system 1106 generates the 3D panoramic image. The 3D panoramic image may be stored in the image datastore 408. In one embodiment, the 3D panoramic image generated by the 3D modeling algorithm is stored in the image stitching and processor system 1106. In some embodiments, the 3D modeling algorithm may generate a visual representation of the floorplan of the physical environment as the environment capture system is utilized to capture various parts of the physical environment.

In step 1312, image stitching and processor system 1106 may provide at least a portion of the generated 3D panoramic image to the user system 1110. The image stitching and processor system 1106 may provide the visual representation of the floorplan of the physical environment.

The order of one or more steps of the flow chart 1300 may be changed without affecting the end product of the 3D panoramic image. For example, the environment capture system may interleave image capture with the image capture device with LiDAR data or depth information capture with the LiDAR 912. For example, the image capture device may capture an image of section of the physical environment with the image capture device, and then LiDAR 912 obtains depth information from section 1605. Once the LiDAR 912 obtains depth information from section, the image capture device may move on to capture an image of another section, and then LiDAR 912 obtains depth information from section, thereby interleaving image capture and depth information capture.

In some embodiments, the devices and/or systems discussed herein employ one image capture device to capture 2D input images. In some embodiments, the one or more image capture devices 1116 can represent a single image capture device (or image capture lens). In accordance with some of these embodiments, the user of the mobile device housing the image capture device can be configured to rotate about an axis to generate images at different capture orientations relative to the environment, wherein the collective fields of view of the images span up to 360° horizontally.

In various embodiments, the devices and/or systems discussed herein may employ two or more image capture devices to capture 2D input images. In some embodiments, the two or more image capture devices can be arranged in relative positions to one another on or within the same mobile housing such that their collective fields of view span up to 360°. In some embodiments, pairs of image capture devices can be used capable of generating stereo-image pairs (e.g., with slightly offset yet partially overlapping fields of view). For example, the user system 1110 (e.g., the device the comprises the one or more image capture devices used to capture the 2D input images) can comprise two image capture devices with horizontal stereo offset fields of-view capable of capturing stereo image pairs. In another example, the user system 1110 can comprise two image capture devices with vertical stereo offset fields-of-view capable of capturing vertical stereo image pairs. In accordance with either of these examples, each of the cameras can have fields-of-view that span up to 360. In this regard, in one embodiment, the user system 1110 can employ two panoramic cameras with vertical stereo offsets capable of capturing pairs of panoramic images that form stereo pairs (with vertical stereo offsets).

The positioning component 1118 may include any hardware and/or software configured to capture user system position data and/or user system location data. For example, the positioning component 1118 includes an IMU to generate the user system 1110 position data in association with the one or more image capture devices of the user system 1110 used to capture the multiple 2D images. The positioning component 1118 may include a GPS unit to provide GPS coordinate information in association with the multiple 2D images captured by one or more image capture devices. In some embodiments, the positioning component 1118 may correlate position data and location data of the user system with respective images captured using the one or more image capture devices of the user system 1110.

Various embodiments of the apparatus provide users with 3D panoramic images of indoor as well as outdoor environments. In some embodiments, the apparatus may efficiently and quickly provide users with 3D panoramic images of indoor and outdoor environments using a single wide field-of-view (FOV) lens and a single light and detection and ranging sensors (LiDAR sensor).

The following is an example use case of an example apparatus described herein. The following use case is of one of the embodiments. Different embodiments of the apparatus, as discussed herein, may include one or more similar features and capabilities as that of the use case.

Figure 14:
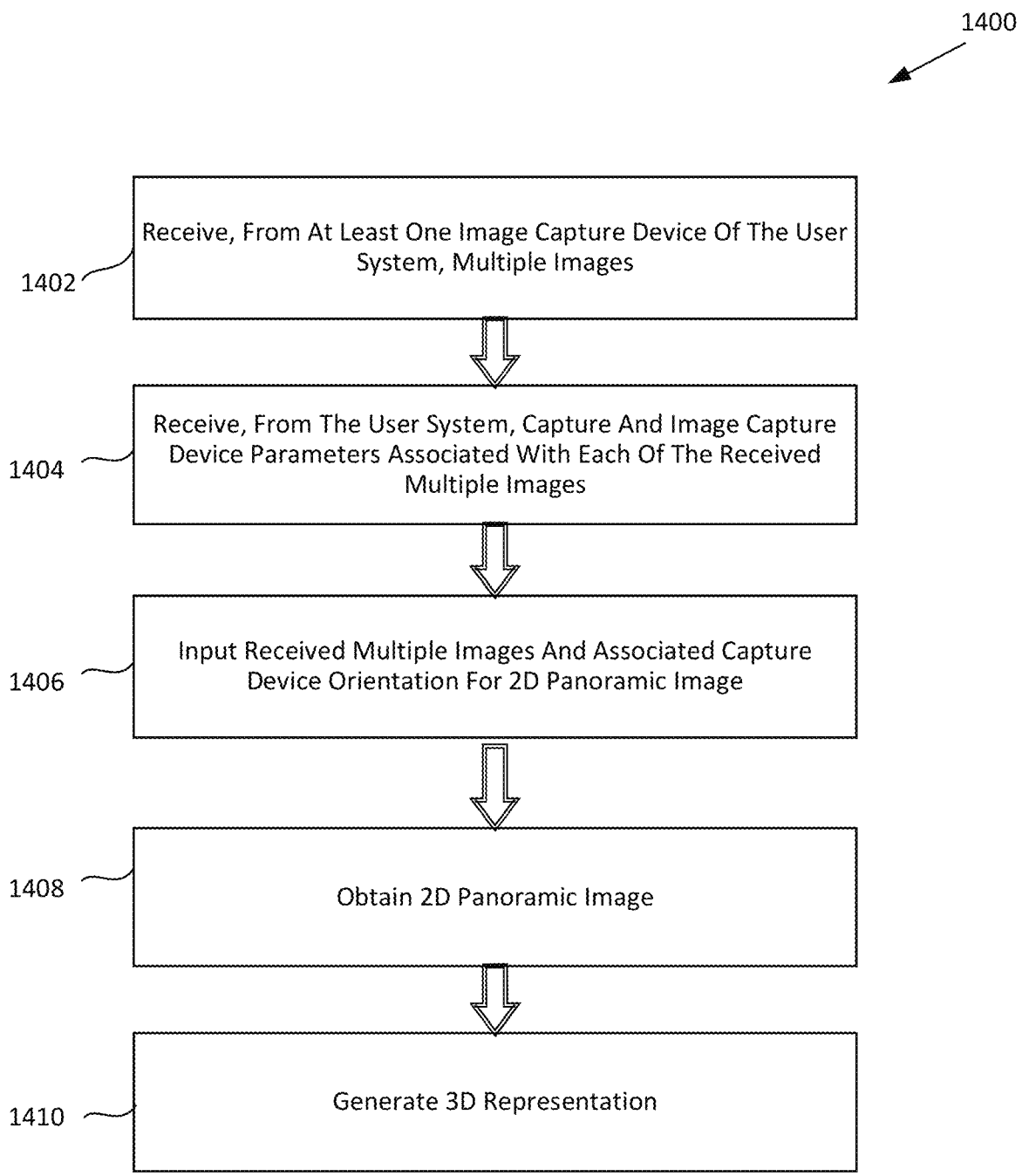
FIG. 14 depicts a flow chart of a 3D and panoramic capture and stitching process according to some embodiments.

FIG. 14 depicts a flow chart of a 3D and panoramic capture and stitching process 1400 according to some embodiments. The flow chart of FIG. 14 refers to the 3D and panoramic capture and stitching system 1102 as including the image capture device, but, in some embodiments, the data capture device may be the user system 1110.

In step 1402, the 3D and panoramic capture and stitching system 1102 may receive multiple 2D images from at least one image capture device. The image capture device of the 3D and panoramic capture and stitching system 1102 may be or include a complementary metal-oxide-semiconductor (CMOS) image sensor. In various embodiments, the image capture device is a charged coupled device (CCD). In one example, the image capture device is a red-green-blue (RGB) sensor. In one embodiment, the image capture device is an IR sensor. Each of the multiple 2D images may have partially overlapping fields of view with at least one other image of the multiple 2D images. In some embodiments, at least some of the multiple 2D images combine to create a 360° view of the physical environment (e.g., indoor, outdoor, or both).

In some embodiments, all of the multiple 2D images are received from the same image capture device. In various embodiments, at least a portion of the multiple 2D images is received from two or more image capture devices of the 3D and panoramic capture and stitching system 1102. In one example, the multiple 2D images include a set of RGB images and a set of IR images, where the IR images provide depth data to the 3D and panoramic capture and stitching system 1102. In some embodiments, each 2D image may be associated with depth data provided from a LiDAR device. Each of the 2D images may, in some embodiments, be associated with positioning data.

In step 1404, the 3D and panoramic capture and stitching system 1102 may receive capture parameters and image capture device parameters associated with each of the received multiple 2D images. Image capture device parameters may include lighting, color, image capture lens focal length, maximum aperture, a field of view, and the like. Capture properties may include pixel resolution, lens distortion, lighting, and other image metadata. The 3D and panoramic capture and stitching system 1102 may also receive the positioning data and the depth data.

In step 1406, the 3D and panoramic capture and stitching system 1102 may take the received information from steps 1402 and 1404 for stitching the 2D images to form a 2D panoramic image. The process of stitching the 2D images is further discussed with regard to the flowchart of FIG. 15.

In step 1408, the 3D and panoramic capture and stitching system 1102 may apply a 3D machine learning model to generate a 3D representation. The 3D representation may be stored in a 3D panoramic image datastore. In various embodiments, the 3D representation is generated by the image stitching and processor system 1106 In some embodiments, the 3D machine learning model may generate a visual representation of the floorplan of the physical environment as the environment capture system is utilized to capture various parts of the physical environment.

In step 1410, the 3D and panoramic capture and stitching system 1102 may provide at least a portion of the generated 3D representation or model to the user system 1110. The user system 1110 may provide the visual representation of the floorplan of the physical environment.

In some embodiments, the user system 1110 may send the multiple 2D images, capture parameters, and image capture parameters to the image stitching and processor system 1106. In various embodiments, the 3D and panoramic capture and stitching system 1102 may send the multiple 2D images, capture parameters, and image capture parameters to the image stitching and processor system 1106.

The image stitching and processor system 1106 may process the multiple 2D images captured by the image capture device of the user system 1110 and stitch them into a 2D panoramic image. The 2D panoramic image processed by the image stitching and processor system 1106 may have a higher pixel resolution than the 2D panoramic image obtained by the 3D and panoramic capture and stitching system 1102.

In some embodiments, the image stitching and processor system 106 may receive the 3D representation and output a 3D panoramic image with pixel resolution that is higher than that of the received 3D panoramic image. The higher pixel resolution panoramic images may be provided to an output device with a higher screen resolution than the user system 1110, such as a computer screen, projector screen, and the like. In some embodiments, the higher pixel resolution panoramic images may provide to the output device a panoramic image in greater detail and may be magnified.

Figure 15:
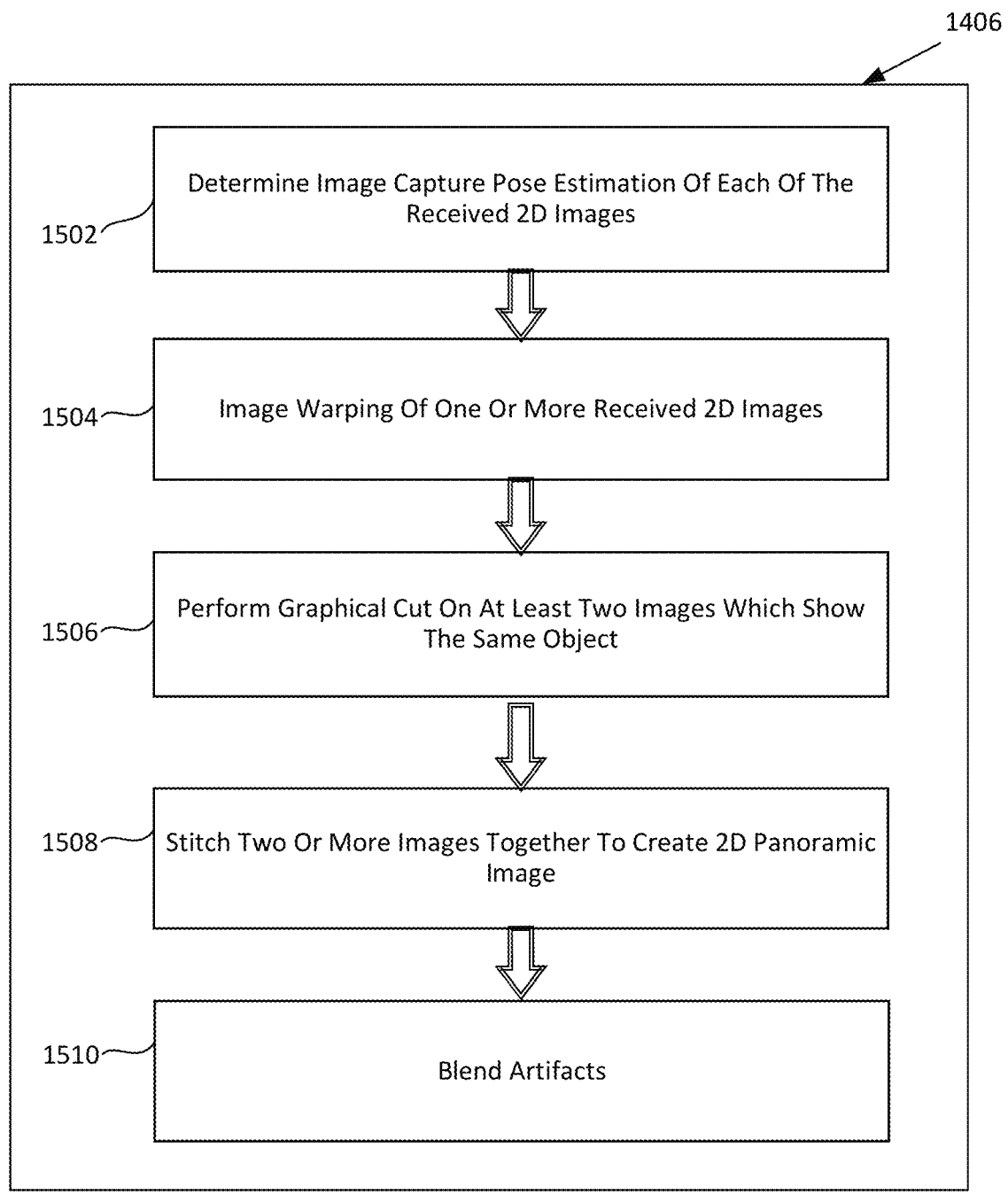
FIG. 15 depicts a flow chart showing further detail of one step of the 3D and panoramic capture and stitching process of FIG. 14.

FIG. 15 depicts a flow chart showing further detail of one step of the 3D and panoramic capture and stitching process of FIG. 14. In step 1502, the image capture position module 1204 may determine image capture device position data associated with each image captured by the image capture device. The image capture position module 1204 may utilize the IMU of the user system 1110 to determine the position data of the image capture device (or the field of view of the lens of the image capture device). The position data may include the direction, angle, or tilt of one or more image capture devices when taking one or more 2D images. One or more of the cropping module 1208, the graphical cut module 1210, or the blending module 1212 may utilize the direction, angle, or tilt associated with each of the multiple 2D images to determine how to warp, cut, and/or blend the images.

In step 1504, the cropping module 1208 may warp one or more of the multiple 2D images so that two images may be able to line up together to form a panoramic image and while at the same time preserving specific characteristics of the images such as keeping a straight line straight. The output of the cropping module 1208 may include the number of pixel columns and rows to offset each pixel of the image to straighten out the image. The amount of offset for each image may be outputted in the form of a matrix representing the number of pixel columns and pixel rows to offset each pixel of the image. In this embodiment, the cropping module 1208 may determine the amount of warping each of the multiple 2D images requires based on the image capture pose estimation of each of the multiple 2D images.

In step 1506, the graphical cut module 1210 determines where to cut or slice one or more of the multiple 2D images. In this embodiment, the graphical cut module 1210 may determine where to cut or slice each of the multiple 2D images based on the image capture pose estimation and the image warping of each of the multiple 2D images.

In step 1508, the stitching module 1206 may stitch two or more images together using the edges of the images and/or the cuts of the images. The stitching module 1206 may align and/or position images based on objects detected within the images, warping, cutting of the image, and/or the like.

In step 1510, the blending module 1212 may adjust the color at the seams (e.g., stitching of two images) or the location on one image that touches or connects to another image. The blending module 1212 may determine the amount of color blending required based on one or more image capture positions from the image capture position module 1204, the image warping from the cropping module 1208, and the graphical cut from the graphical cut module 1210.

The order of one or more steps of the 3D and panoramic capture and stitching process 1400 may be changed without affecting the end product of the 3D panoramic image. For example, the environment capture system may interleave image capture with the image capture device with LiDAR data or depth information capture. For example, the image capture device may capture an image of a section 1605 of FIG. 16 of the physical environment with the image capture device, and then LiDAR 612 obtains depth information from the section 1605. Once the LiDAR obtains depth information from the section 1605, the image capture device may move on to capture an image of another section 1610, and then LiDAR 612 obtains depth information from the section 1610, thereby interleaving image capture and depth information capture.

FIG. 16 depicts a block diagram of an example digital device 1602 according to some embodiments. Any of the user system 1110, the 3D panoramic capture and stitching system 1102, and the image stitching and processor system may comprise an instance of the digital device 1602. Digital device 1602 comprises a processor 1604, a memory 1606, a storage 1608, an input device 1610, a communication network interface 1612, an output device 1614, an image capture device 1616, and a positioning component 1618. Processor 1604 is configured to execute executable instructions (e.g., programs). In some embodiments, the processor 1604 comprises circuitry or any processor capable of processing the executable instructions.

Memory 1606 stores data. Some examples of memory 1606 include storage devices, such as RAM, ROM, RAM cache, virtual memory, etc. In various embodiments, working data is stored within memory 1606. The data within memory 1606 may be cleared or ultimately transferred to storage 1608.

Storage 1608 includes any storage configured to retrieve and store data. Some examples of storage 1608 include flash drives, hard drives, optical drives, and/or magnetic tape. Each of memory 1606 and storage 1608 comprises a computer-readable medium, which stores instructions or programs executable by processor 1604.

The input device 1610 is any device that inputs data (e.g., touch keyboard, stylus). Output device 1614 outputs data (e.g., speaker, display, virtual reality headset). It will be appreciated that storage 1608, input device 1610, and an output device 1614. In some embodiments, the output device 1614 is optional. For example, routers/switchers may comprise processor 1604 and memory 1606 as well as a device to receive and output data (e.g., a communication network interface 1612 and/or output device 1614).

The communication network interface 1612 may be coupled to a network (e.g., communication network 104) via communication network interface 1612. Communication network interface 1612 may support communication over an Ethernet connection, a serial connection, a parallel connection, and/or an ATA connection. Communication network interface 1612 may also support wireless communication (e.g., 802.16 a/b/g/n, WiMAX, LTE, Wi-Fi). It will be apparent that the communication network interface 1612 may support many wired and wireless standards.

A component may be hardware or software. In some embodiments, the component may configure one or more processors to perform functions associated with the component. Although different components are discussed herein, it will be appreciated that the server system may include any number of components performing any or all functionality discussed herein.

The digital device 1602 may include one or more image capture devices 1616. The one or more image capture devices 1616 can include, for example, RGB cameras, HDR cameras, video cameras, and the like. The one or more image capture devices 1616 can also include a video camera capable of capturing video in accordance with some embodiments. In some embodiments, one or more image capture devices 1616 can include an image capture device that provides a relatively standard field-of-view (e.g., around 75°). In other embodiments, the one or more image capture devices 1616 can include cameras that provide a relatively wide field-of-view (e.g., from around 120° up to 360°), such as a fisheye camera, and the like (e.g., the digital device 1602 may include or be included in the environment capture system 400).

A component may be hardware or software. In some embodiments, the component may configure one or more processors to perform functions associated with the component. Although different components are discussed herein, it will be appreciated that the server system may include any number of components performing any or all functionality discussed herein.

The invention claimed is:

1. An image capture device comprising:
   a housing, the housing having a front side and a back side;
   a first motor coupled to the housing at a first position between the front side and the back side of the housing, the first motor being configured to horizontally turn the image capture device substantially 270 degrees about a vertical axis;
   a wide-angle lens coupled to the housing of the image capture device at a second position between the front side and the back side of the housing along the vertical axis, the second position being a no-parallax point, the wide-angle lens having a field of view away from the front side of the housing;
   an image sensor the housing of the image capture device and configured to generate image signals from light received by the wide-angle lens;
   a mount coupled to the first motor;
   a LiDAR coupled to the housing of the image capture device at a third position, the LiDAR configured to generate laser pulses and generate depth signals;
   a second motor coupled to the housing of the image capture device; and
   a mirror coupled to the second motor, the second motor configured to rotate the mirror around a horizontal axis, the mirror including an angled surface configured to receive the laser pulses from the LiDAR and direct the laser pulses about the horizontal axis.

2. The image capture device of claim 1, wherein the image sensor is configured to generate a first plurality of images at different exposures when the image capture device is stationary and pointed in a first direction.

3. The image capture device of claim 2, wherein the first motor is configured to turn the image capture device about the vertical axis after the first plurality of images are generated.

4. The image capture device of claim 3, wherein the image sensor does not generate images while the first motor turns the image capture device and wherein the LiDAR generates depth signals based on the laser pulses while the first motor turns the image capture device.

5. The image capture device of claim 3, wherein the image sensor is configured to generate a second plurality of images at the different exposures when the image capture device is stationary and pointed in a second direction and the first motor is configured to turn the image capture device 90 degrees about the vertical axis after the second plurality of images are generated.

6. The image capture device of claim 5, wherein the image sensor is configured to generate a third plurality of images at the different exposures when the image capture device is stationary and pointed in a third direction and the first motor is configured to turn the image capture device 90 degrees about the vertical axis after the third plurality of images are generated.

7. The image capture device of claim 6, wherein the image sensor is configured to generate a fourth plurality of images at the different exposures when the image capture device is stationary and pointed in a fourth direction and the first motor is configured to turn the image capture device 90 degrees about the vertical axis after the fourth plurality of images are generated.

8. The image capture device of claim 7, further comprising a processor configured to blend frames of the first plurality of images before the image sensor generates the second plurality of images.

9. The image capture device of claim 7, further comprising a remote digital device in communication with the image capture device and configured to generate a 3D visualization based on the first, second, third, and fourth plurality of images and the depth signals, the remote digital device being configured to generate the 3D visualization using no more images than the first, second, third, and fourth plurality of images.

10. The image capture device of claim 9, wherein first, second, third, and fourth plurality of images are generated between turns that combined turns turning the image capture device 270 degrees around the vertical axis.

11. The image capture device of claim 4, wherein a speed or rotation of the mirror around the horizontal axis increases as the first motor turns the image capture device.

12. The image capture device of claim 1, wherein the angled surface of the mirror is 90 degrees.

13. The image capture device of claim 1 wherein the LiDAR emits the laser pulses in a direction that is opposite the front side of the housing of the image capture device.

14. A method comprising:
receiving light from a wide-angle lens of an image capture device, the wide-angle lens being coupled to a housing of the image capture device, the light being received at a field of view of the wide-angle lens, the field of view extending away from a front side of the housing;
generating a first plurality of images by an image sensor of an image capture device using the light from the wide-angle lens, the image sensor being coupled to the housing of the image capture device, the first plurality of images being at different exposures;
horizontally turning the image capture device by a first motor substantially 270 degrees about a vertical axis, the first motor being coupled to the housing in a first position between the front side and a back side of the housing, the wide-angle lens being at a second position along the vertical axis, the second position being a no-parallax point;
rotating a mirror with an angled surface around horizontal axis by a second motor, the second motor being within coupled to the housing of the image capture device;
generating laser pulses by a LiDAR, the LiDAR being within the housing of the image capture device at a third position, the laser pulse being directed to the rotating mirror while the image capture device horizontally turns; and
generating depth signals by the LiDAR based on the laser pulses.

15. The method of claim 14, wherein generating the first plurality of images by the image sensor occurs before the image captured device horizontally turns.

16. The method of claim 15, wherein the image sensor does not generate images while the first motor turns the image capture device and wherein the LiDAR generates the depth signals based on the laser pulses while the first motor turns the image capture device.

17. The method of claim 16, further comprising:
generating a second plurality of images at the different exposures by the image sensor when the image capture device is stationary and pointed in a second direction; and
turning the image capture device 90 degrees about the vertical axis by the first motor after the second plurality of images are generated.

18. The method of claim 17, further comprising:
generating a third plurality of images at the different exposures by the image sensor when the image capture device is stationary and pointed in a third direction; and
turning the image capture device 90 degrees about the vertical axis by the first motor after the third plurality of images are generated.

19. The method of claim 18, further comprising:
generating a fourth plurality of images at the different exposures by the image sensor when the image capture device is stationary and pointed in a fourth direction.

20. The method of claim 19, further comprising generating a 3D visualization using the first, second, third, and fourth plurality of images and based on the depth signals, the generating the 3D visualization not using any other images.

21. The method of claim 17, further comprising blending frames of the first plurality of images before the image sensor generates the second plurality of images.

22. The method of claim 19, wherein first, second, third, and fourth plurality of images are generated between turns that combined turns turning the image capture device 270 degrees around the vertical axis.

23. The method of claim 14, wherein a speed or rotation of the mirror around the horizontal axis increases as the first motor turns the image capture device.

* * * * *